(12) United States Patent
Falanga et al.

(10) Patent No.: US 8,540,284 B2
(45) Date of Patent: Sep. 24, 2013

(54) SNOWBOARD SIMULATION RIDING DEVICE

(75) Inventors: Mark Falanga, Wilmette, IL (US); Andres J. Salas-Acosta, San Juan, PR (US)

(73) Assignee: No Snow Ventures, LLC, Wilmette, IL (US)

( * ) Notice: Subject to any disclaimer, the term of this patent is extended or adjusted under 35 U.S.C. 154(b) by 0 days.

(21) Appl. No.: 13/275,990

(22) Filed: Oct. 18, 2011

(65) Prior Publication Data

US 2013/0093151 A1 Apr. 18, 2013

(51) Int. Cl.
*A63C 17/01* (2006.01)

(52) U.S. Cl.
USPC ............... 280/842; 280/87.041; 280/87.042; 280/87.043

(58) Field of Classification Search
USPC ............ 280/87.042, 1.175, 93.504, 93.505, 280/86, 79, 842, 124.1, 784, 786, 787, 790, 280/791, 88, 263, 265, 240, 268, 281.1, 282, 280/283, 80.2, 62; 267/6, 228
See application file for complete search history.

(56) References Cited

U.S. PATENT DOCUMENTS

| | | | | |
|---|---|---|---|---|
| 2,596,655 A | * | 5/1952 | Converse | 280/86.1 |
| 4,076,266 A | * | 2/1978 | Krausz | 280/87.042 |
| 4,943,075 A | * | 7/1990 | Gates | 280/842 |
| 4,955,626 A | * | 9/1990 | Smith et al. | 280/87.042 |
| 5,169,166 A | * | 12/1992 | Brooks | 280/87.042 |
| 5,251,934 A | * | 10/1993 | Gates | 280/842 |
| 5,263,725 A | * | 11/1993 | Gesmer et al. | 280/11.28 |
| 5,458,351 A | * | 10/1995 | Yu | 280/87.042 |
| 5,551,717 A | | 9/1996 | De Courcey Milne | |
| 5,613,695 A | * | 3/1997 | Yu | 280/14.25 |
| 5,645,291 A | * | 7/1997 | Ramage | 280/87.042 |
| 5,868,408 A | | 2/1999 | Miller | |
| 5,950,754 A | * | 9/1999 | Ondrish, Jr. | 180/181 |
| 5,975,229 A | | 11/1999 | Hosoda | |
| 5,997,018 A | * | 12/1999 | Lee | 280/87.042 |
| 6,059,303 A | * | 5/2000 | Bradfield | 280/87.042 |

(Continued)

FOREIGN PATENT DOCUMENTS

GB 693646 * 7/1953
WO WO 9419072 A1 * 9/1994

OTHER PUBLICATIONS

Randal Skateboard Trucks FAQ page.*

(Continued)

*Primary Examiner* — John R Olszewski
*Assistant Examiner* — Steve Clemmons
(74) *Attorney, Agent, or Firm* — Lempia Summerfield Katz LLC

(57) ABSTRACT

A wheeled riding device has a body with an elongate front arm, a turning tail, and a joint part pivotally connecting the turning tail and front arm relative to one another. A front wheel is carried by a forward end of the front arm. Rear wheels are carried by a rear end of the turning tail. A standing platform is supported over the front arm and turning tail. The rear wheels and turning tail can pivot laterally side to side relative to the front arm. The front wheel and front arm can pivot vertically up and down relative to the standing platform. The front wheel, during a turn, is cambered inward into the turn. The device is controlled by the rider using body movements and skills required to ride a snowboard.

20 Claims, 20 Drawing Sheets

(56) References Cited

U.S. PATENT DOCUMENTS

| | | | | |
|---|---|---|---|---|
| 6,123,348 | A * | 9/2000 | Miller | 280/87.042 |
| 6,318,750 | B1 * | 11/2001 | Lan | 280/642 |
| 6,435,290 | B1 | 8/2002 | Justus et al. | |
| 6,536,788 | B1 * | 3/2003 | Kuncz et al. | 280/87.041 |
| 6,698,776 | B2 | 3/2004 | Todd | |
| 6,926,294 | B2 * | 8/2005 | Lewis | 280/87.042 |
| 6,981,711 | B2 | 1/2006 | Seta | |
| 7,073,805 | B2 * | 7/2006 | Yan | 280/221 |
| 7,147,235 | B2 * | 12/2006 | West | 280/87.042 |
| 7,441,787 | B1 | 10/2008 | Jordan | |
| 7,484,742 | B2 * | 2/2009 | Choi | 280/87.042 |
| 7,581,739 | B2 * | 9/2009 | Fraley | 280/87.041 |
| 7,600,768 | B2 * | 10/2009 | Chen et al. | 280/87.042 |
| 7,744,100 | B2 * | 6/2010 | Cole | 280/11.115 |
| 7,766,351 | B2 * | 8/2010 | Chen et al. | 280/87.042 |
| 7,775,534 | B2 * | 8/2010 | Chen et al. | 280/87.042 |
| 7,810,825 | B2 * | 10/2010 | Cole | 280/87.042 |
| D654,542 | S | 2/2012 | Chiu et al. | |
| D658,724 | S | 5/2012 | Epstein | |
| 8,371,590 | B2 | 2/2013 | Kortschot | |
| 2009/0273152 | A1 * | 11/2009 | Chung | 280/87.042 |
| 2010/0117317 | A1 * | 5/2010 | Smith | 280/87.042 |

OTHER PUBLICATIONS

International Search Report and Written Opinion from related PCT Application No. PCT/US12/60604 dated Mar. 26, 2013.

* cited by examiner

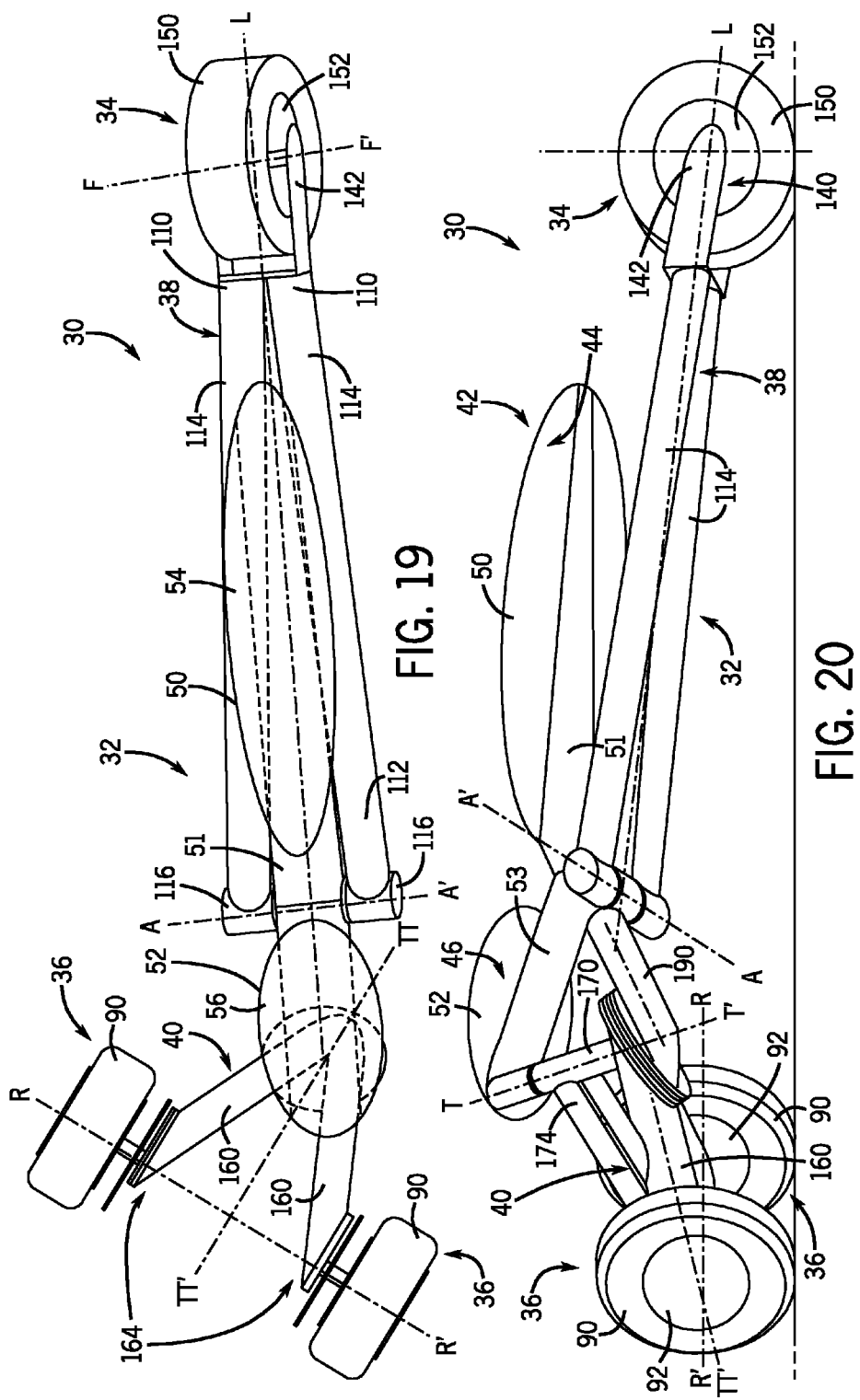

SNOWBOARD SIMULATION RIDING DEVICE

BACKGROUND

1. Field of the Disclosure

The invention disclosed herein is generally related to outdoor sports equipment, and more particularly to a riding device configured to simulate riding a snowboard, but while on non-snow covered terrain.

2. Description of Related Art

Snowboarding is a popular outdoor activity and has been for quite some time. However, like many winter activities, snowboarding requires cold temperatures and snow in order to participate. Thus, one typically cannot practice snowboarding to hone one's skills without cold and snow. In most readily accessible locations, snow and cold temperatures do not linger year-round. Also, in many locations, snow and cold temperatures are either relatively rare or do not occur at all.

Snowboard riders also generally must perform unique maneuvers and body movements to correctly and safely operate a snowboard. Thus, a snowboarder must be able to frequently ride in order to improve their technique. However, a snowboard is not suited for use on terrain that is not covered by snow. Thus, riders typically cannot practice such maneuvers year-round or train their body for the specific movements unless riding a snowboard and do so on snow covered terrain.

Others have tried to develop wheeled boards or training devices that can be used on terrain without snow and that attempt to simulate riding a snowboard. A number of these devices are very much like skateboards and have a board on wheels. The devices, however, may have modified wheel trucks, suspension mechanisms, axles, and wheel arrangements in order to perform less like a conventional skateboard. It is understood that operating a skateboard and operating a snowboard are similar, but that they still require different maneuvers and body movements, particularly when turning the device. The feet of snowboard riders are fixed or bound to the board, whereas the feet of a skateboard rider are free and can be positioned anywhere on the board. Also, snowboards can travel in lengthwise directions, sideways, and at angles in between by sliding on their bottom surfaces. A snowboard turns by the rider leaning over an edge of the board and either carving the edge into the snow, by applying more pressure on one edge of the bottom surface or the other, or a combination of such movements. Skateboards typically turn by tilting the board to one side, which causes the front and rear wheel axles to turn from parallel to slightly non-parallel relative to one another, allowing the board to turn.

Also, snowboards are operated on a mountain slope having a relatively steep incline. Skateboard wheels are typically too small in diameter and width to function on dirt or extremely rough terrain. Thus, a number of snowboard training devices are intended for use on relatively smooth surfaces, which is no different than a common skateboard. One known device is disclosed in U.S. Pat. No. 5,868,408 and is similar to a skateboard. However, the board has foot bindings to keep the rider's feet connected to the board. The board also has larger width and diameter wheels, two in front and two in back. The wheel trucks each include a suspension spring to absorb impact caused by rougher terrain. U.S. Pat. No. 7,441,787 also discloses such a device with a board and foot bindings. The board includes a plurality of football-shaped wheels that are intended to ride along rough terrain.

These known devices are not very practical for riding on steep and rough, downhill, unpaved terrain. Also, these known devices do not ride very well on such rough terrain. Further, these known devices do not simulate the maneuvers and body movements required for riding a snowboard, but instead are very similar to skateboards.

SUMMARY

The present invention is generally directed to a snowboard simulation device or wheeled riding device configured to simulate riding a snow board, but on snowless downhill terrain. In one example according to the teachings of the present invention, a wheeled riding device has a body with an elongate front arm and a turning tail pivotally connected relative to one another at a joint part. A front wheel is carried by a forward end of the front arm and rear wheels are carried by a rear end of the turning tail. A standing platform is supported over the front arm and turning tail. The rear wheels and turning tail can pivot laterally side to side relative to the front arm. The front wheel and front arm can pivot vertically up and down relative to the standing platform.

In one example, the joint part can be part of and beneath the standing platform.

In one example, the joint part can define two separate and distinct axes including an arm axis and a tail axis.

In one example, the front arm can pivot about an arm axis oriented generally horizontally side to side and the turning tail can pivot about a tail axis oriented generally vertically but tilted at an angle relative to a vertical reference.

In one example, the wheeled riding device can have a suspension mechanism connected between the standing platform and the front arm.

In one example, the wheeled riding device can have a suspension mechanism that includes a shock absorber and a set of optionally selectable links different from one another, each link for connecting the shock absorber to the wheeled riding device.

In one example, the wheeled riding device can have a suspension mechanism that includes two or more different, optionally selectable shock absorbers and a link connecting a selected one of the shock absorbers to the wheeled riding device.

In one example, the wheeled riding device can have a suspension mechanism that includes at least two optionally selectable shock absorbers and one or more sets of optionally selectable links different from one another, each link for connecting one of the two shock absorbers to the wheeled riding device.

In one example, the standing platform and the front arm each can have a V-shaped structure with a pair of spaced apart legs, and can have a suspension mechanism including a shock absorber mounted between the legs of each.

In one example, the wheeled riding device can have only one front wheel, only two rear wheels, two brakes with one brake coupled to each of the two rear wheels, and a hand held actuator coupled to the two brakes by cables and having two levers. Each of the two levers can be for independently operating a corresponding one of the two brakes.

In one example, the joint part can have a plate connected to a mating plate on the turning tail. Mating surfaces of the plate and mating plate can define a plane with a tail axis oriented perpendicular to the plane. The turning tail can be pivotable about the tail axis.

In one example, a turning axis of the turning tail can be oriented generally vertically but tilted at an angle relative to a vertical reference.

In one example, the wheeled riding device can have a self-centering mechanism associated with the turning tail that biases the turning tail to a center home position whereby the front wheel and the rear wheels roll in the same direction and the riding device travels generally in a straight line.

In one example according to the teachings of the present invention, a snowboard simulation device has an elongate front arm with a free end and a back end, a turning tail with a forward end and a rear end, and a platform structure defining foot landings and having a lengthwise axis. The back end of the front arm and the forward end of the turning tail are each pivotally connected to the platform part. A front wheel is carried by the free end of the front arm. Rear wheels are carried by the rear end of the turning tail. By turning the platform structure about its lengthwise axis, the front arm turns relative to the turning tail side to side and the front wheel is cambered to the same side.

In one example, the front arm can pivot about the back end at an arm pivot such that the free end moves up and down relative to the platform structure.

In one example, the platform structure has a plate connected to a mating plate on the turning tail. Mating surfaces of the plates can define a plane and can be pivotable relative to one another about a tail axis oriented perpendicular to the plane.

In one example, a plane defined by rotating parallel plates of the turning tail and platform structure can be oriented generally horizontally but tilted at an angle relative to a horizontal reference.

In one example, the front arm can pivot at its back end about a generally horizontal, laterally oriented arm axis such that the free end can move up and down relative to the platform structure.

In one example, the snowboard simulation can have a suspension mechanism connected between the platform structure and the front arm between the back end and free end. The suspension mechanism can include a shock absorber and a link connecting one end of the shock absorber to the device.

In one example, the snowboard simulation device can include a suspension kit having a plurality of different, interchangeable components optionally selectable to selectively alter one or more performance characteristics of the suspension mechanism.

In one example, the snowboard simulation device can have two rear wheels, a brake coupled to each of the two rear wheels, and a hand brake actuator for operating the brakes. The hand brake actuator can have two levers, one for independently actuating each of the brakes.

In one example, the snowboard simulation device can have a self-centering mechanism configured to bias the turning tail to a center home position relative to the front arm.

In one example according to the teachings of the present invention, a snowboard simulation device has an elongate front arm with a free end and a back end, a turning tail with a forward end and a rear end, and a platform structure defining foot landings. The front arm is connected to and pivotable about an arm axis and the turning tail is connected to and pivotable about a tail axis relative to the platform structure. A single front wheel is carried by the free end of the front arm. Two laterally spaced apart rear wheels are carried by the rear end of the turning tail. A brake associated with each of the rear wheels. The arm axis is generally horizontal and oriented perpendicular to a lengthwise axis of the platform structure. The tail axis is generally vertical but tilted rearward at an angle relative to a vertical reference, resulting in an articulated steering motion when the front arm is leaned to one side or the other about the lengthwise axis.

BRIEF DESCRIPTION OF THE DRAWINGS

Objects, features, and advantages of the present invention will become apparent upon reading the following description in conjunction with the drawing figures, in which:

FIG. 19 shows a top view of the riding device shown in FIGS. 17 and 18, but with the riding device in a turning orientation.

FIG. 20 shows a side view of the riding device shown in FIG. 19.

DETAILED DESCRIPTION OF THE DISCLOSURE

The invention disclosed herein solves or improves upon one or more of the above-noted and/or other problems and disadvantages with prior known snowboard training and simulation devices. The disclosed riding device employs large diameter pneumatic wheels to support a unique riding structure. In one example, the disclosed riding device can have one front wheel and two rear wheels. In one example, the disclosed riding device can employ articulated steering for turning the riding device. In one example, the disclosed riding device can have an elongate front arm and a rear turning tail that can turn or pivot relative to one another. In one example, the disclosed riding device has foot bindings on a platform that the rider can lean to one side or the other to turn the device. In one example, the disclosed riding device can have a suspension mechanism that allows one or more of the wheels and/or frame or body structures to absorb significant impact and forces applied to the device while riding on uneven terrain. In one example, the disclosed riding device can have a brake system coupled to one or more of the wheels. In one example, the disclosed riding device can have a brake system to be actuated during use in order to operate brakes to assist in controlling the speed of the device during use. These and other objects, features, and advantages of the disclosed device will become apparent to one having ordinary skill in the art upon reading this disclosure.

Figure 1:
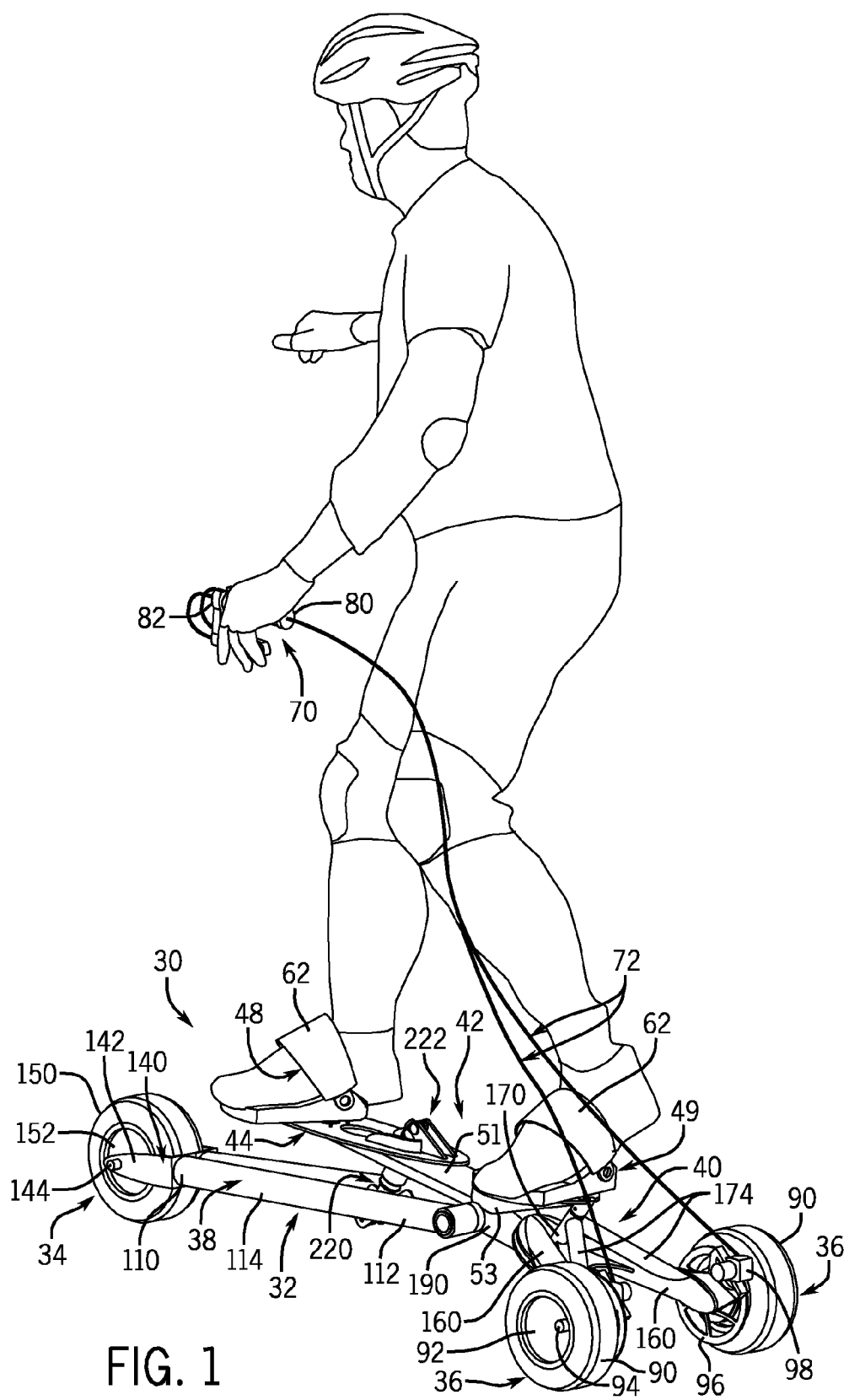
FIG. 1 shows one example of a snowboard simulation riding device constructed in accordance with the teachings of the present invention, the riding device being shown with a rider aboard.
Figure 2:
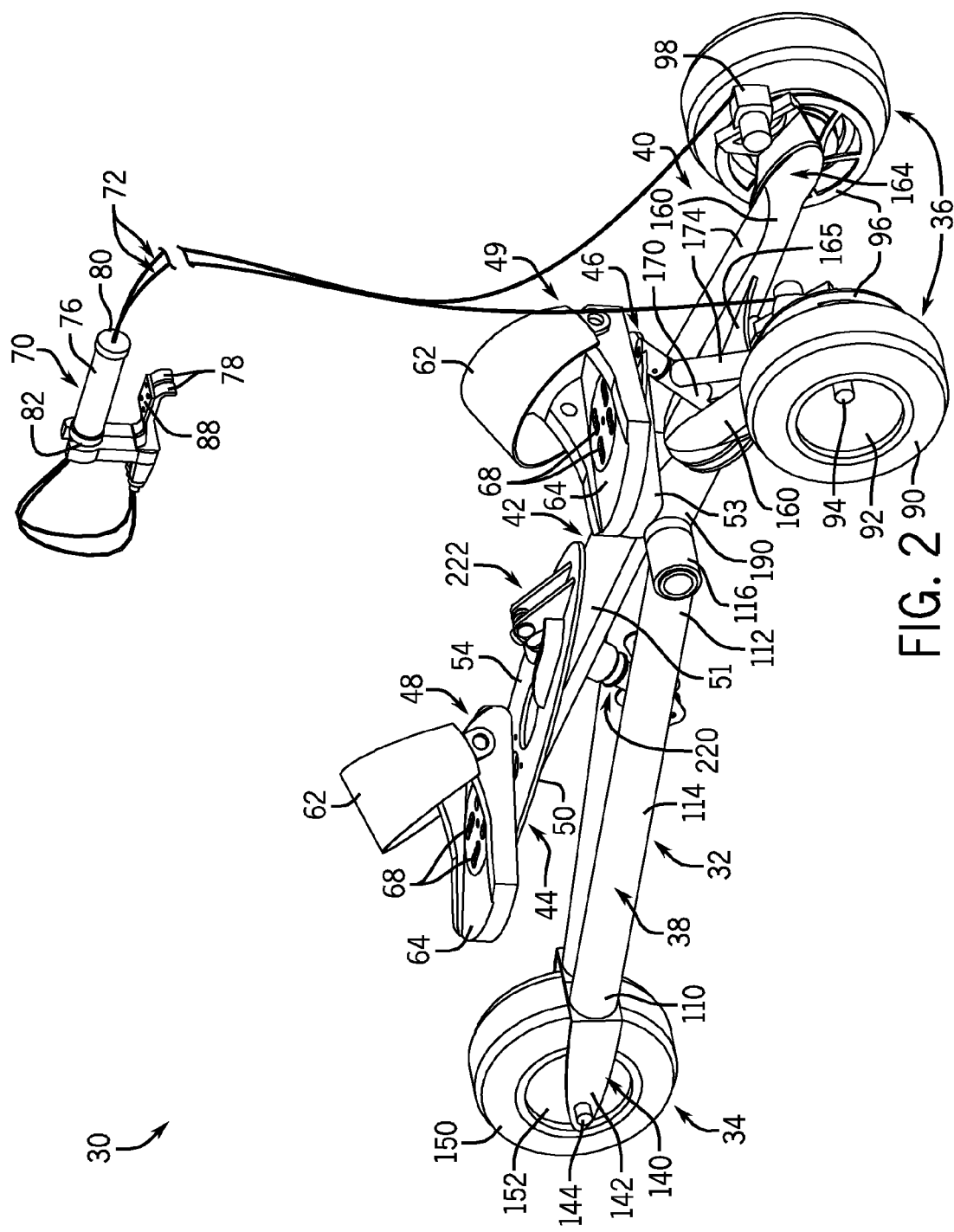
FIG. 2 shows a perspective view of the riding device shown in FIG. 1, but with no rider aboard.

Turning now to the drawings, FIGS. 1 and 2 illustrate one example of a wheeled riding device 30 constructed in accordance with the teachings of the present invention. FIG. 1 shows a user or rider standing on the device 30 in a manner that it would be used. FIG. 2 shows the device in FIG. 1, but without the rider. In the disclosed example, the wheeled riding device 30 is intended to simulate riding a snowboard and thus is also described herein as a snowboard simulation device. However, the device can be used simply as a riding device for entertainment, sport, training, exercise, or the like.

In the disclosed example, the riding device 30 generally has a body or frame structure 32, a single front wheel 34, and a pair of spaced apart rear wheels 36. The body 32 is formed of several components including a front arm 38, a rear turning tail 40, and a standing platform or platform structure 42 configured to support the user as depicted in FIG. 1. The platform structure 42 has two separate platform sections or foot landings including a front landing 44 and a rear landing 46. Each of the foot landings in this example is provided with a binding 48, 49, respectively, configured to secure a user's feet to the respective landings 44 and 46. The bindings 48, 49 can vary in configuration and construction, but in one example can be similar or identical to conventional snowboard bindings.

Figure 3:
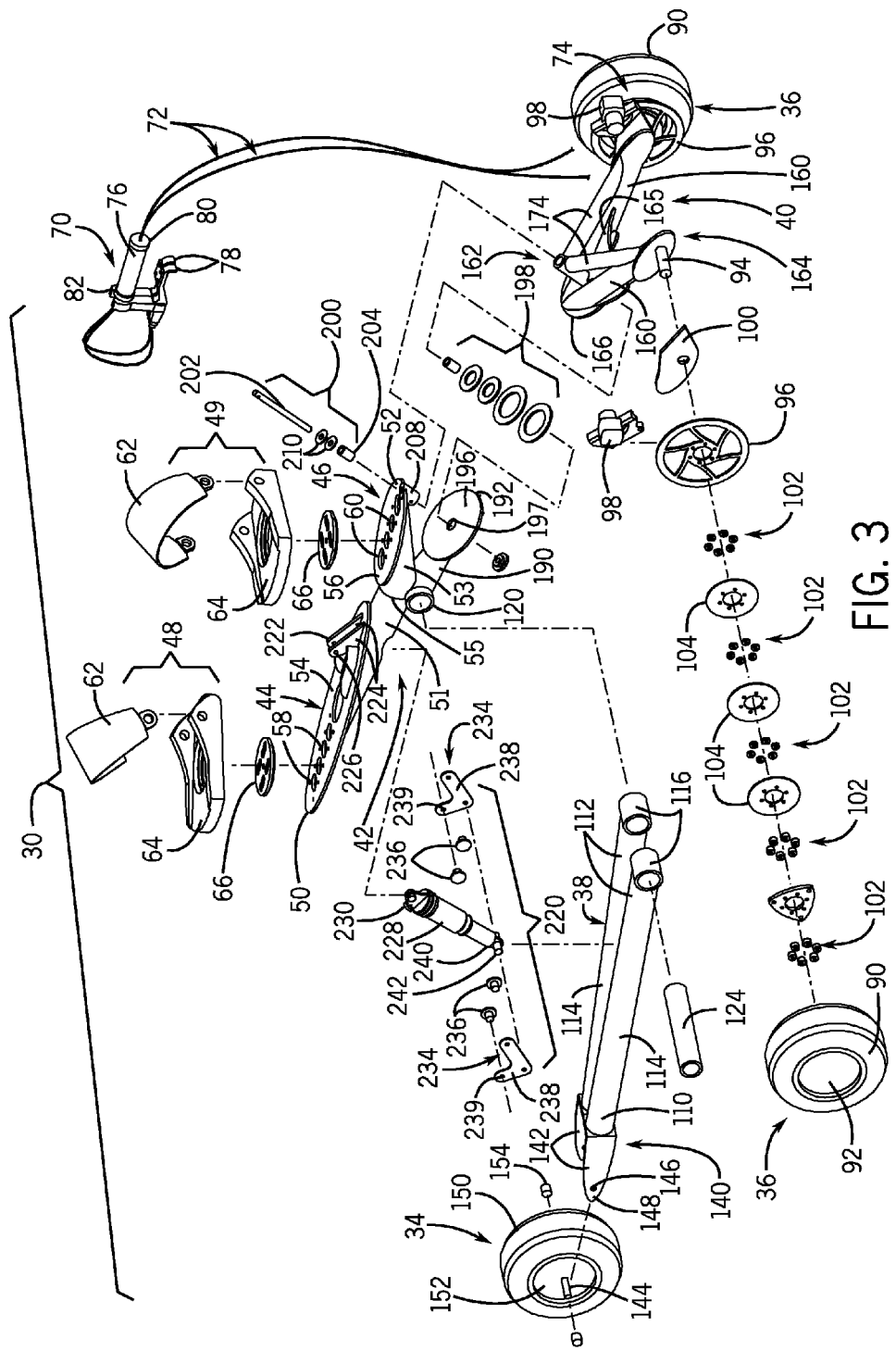
FIG. 3 shows an exploded view of the riding device shown in FIG. 2.
Figure 4:
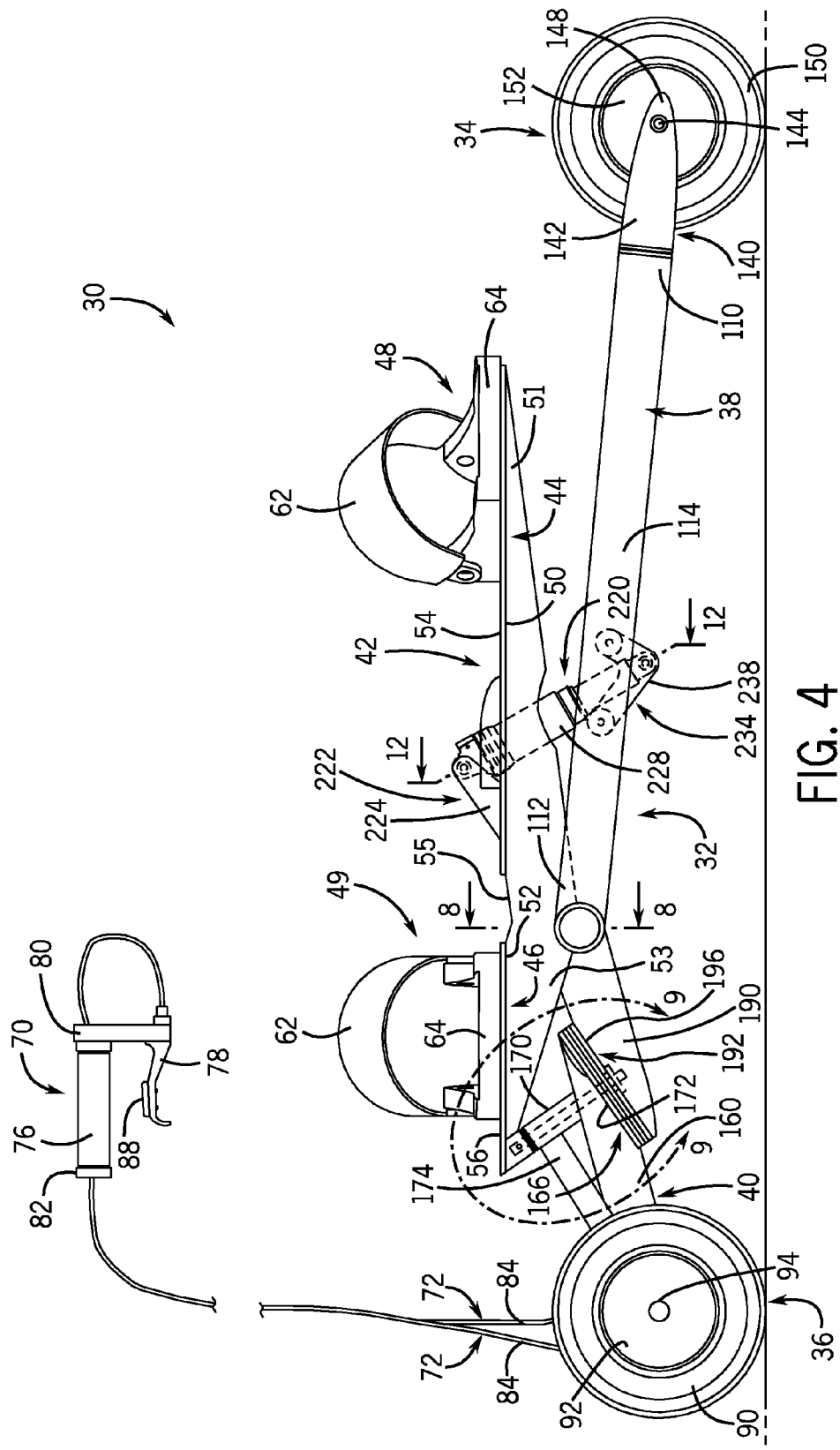
FIG. 4 shows a side view of the riding device shown in FIG. 2.
Figure 5:
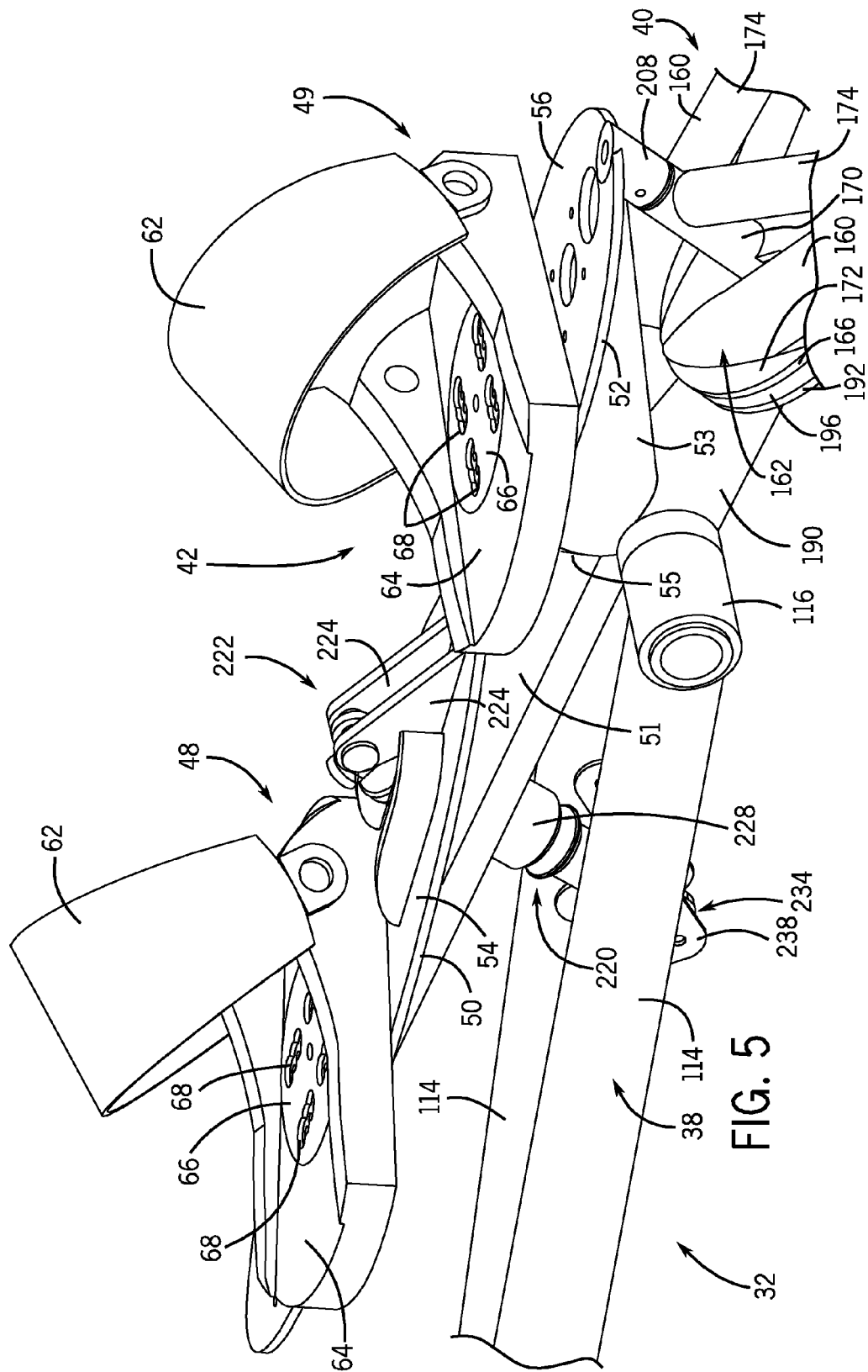
FIG. 5 shows a close up perspective view of a standing platform portion of the riding device shown in FIG. 2.

FIG. 3 shows an exploded view of the device 30 and FIG. 4 shows a side view of the device, each for later reference with respect to various components of the riding device, when described herein. With reference to FIGS. 2-5, each of the foot landings 44 and 46 can be formed as an integral part of the platform structure 42. The foot landings 44, 46 each generally have a footpad 50, 52, respectively, with a flat top surface 54, 56. Each foot pad 50, 52 is mounted on, welded to, or part of a support tube 51, 53 of the platform structure 42. The front support tube 51 is welded or joined to the rear support tube 53 at a joint 55 located under and between the foot pads 50, 52. The support tubes 51, 53 can be one integral component when formed or can be two or more components fastened, welded, or otherwise joined to one another. As will be evident to those having ordinary skill in the art, the configuration and construction of these basic parts of the platform structure can vary and yet function as intended. The support tubes can be solid, hollow, or embody multiple adjacent smaller sized struts.

Each of the foot pads 50, 52 has a plurality of holes 58, 60 provided in the top surface 54, 56 or through the footpad 50, 52. The holes 58, 60 are spaced apart in a lengthwise direction along the corresponding footpad 50, 52. Each individual hole 58, 60 creates a different mounting location for the corresponding binding 48, 49. Thus, a user can install each of the bindings 48, 49 to accommodate a variety of different stance positions, user sizes, and the like. For example, the user can install the front binding 48 on the front foot landing 44 in a forward-most one of the holes 58 and can install the rear binding 49 on the rear foot landing 46 in a rearward-most one of the holes 60 to create a wide stance for the user. In another example, the front binding 48 can be installed in the same forward-most location on the front foot landing 44 but the binding 49 on the rear foot landing 46 can be installed also at the forward most hole 60 to provide a more narrow stance and a forward standing position on the device 30. In yet another example, the binding 48 can be installed on the front foot landing 44 at the rearward most hole 58 and the binding 49 can be installed on the rear foot landing 46 in the rearward most hole 60 for a more narrower stance and a rearward standing position on the device 30.

As is known in the art, each of the bindings 48, 49 can generally include a retaining strap 62 connected to a foot plate 64. Each foot plate 64 can be attached to its respective footpad 50, 52 by a mounting disc 66. As is known in the art, the mounting discs can also be provided with a plurality of slots or openings 68 therein. If provided as slots, the openings 68 in the discs 66 can allow for micro-positioning of the foot plate 64 relative to the footpad 50, 52. Thus, a user could selectively adjust a relative fore and aft positioning of the foot plate 64 relative to each footpad 50, 52. The circular discs can also allow for rotationally selective adjustment of the foot plates 64 on each of the footpads 50, 52, as desired. In one example, a rider may want one or both of their feet oriented more or less perpendicular to the board. In another example, the rider may adjust the binding orientation to ride with their left foot forward, i.e., in a regular stance, or with their right foot forward, i.e., in a goofy foot stance. The discs can alternatively allow for rotational movement of the foot plates 64 during use of the riding device 30. The configuration and construction of the bindings 48, 49 can vary considerably and yet fall within the spirit and scope of the present invention. The intent is to bind or affix the user's feet to the device 30 during use so that, similar to a snowboard, if the user falls the device does not run off and so that the rider can have greater control over the device during use.

With reference to FIGS. 2-4, 6, and 7, the device 30 also includes a brake system that can be operated by the user while riding the device. In this example, the brake system generally includes a hand held actuator 70 connected via brake cables 72 that extend from the actuator to rear brake assemblies 74, one at each of the rear wheels 36. Similar to the bindings 48, 49, the brake system can use mostly conventional components, but be adapted for use on the riding device 30. However, the actuator 70 has several unique features. In this example, the actuator 70 has a hand grip 76 and a pair of brake levers 78 pivotally coupled to the handgrip. Each brake lever 78 in this example is coupled via one of the cables 72 independently to one of the brake assemblies 74. Thus, each brake lever 78 can be manipulated by a user to independently operate one of the brake assemblies 74.

Each of the brake cables 72 is routed to one end 80 of the handgrip 76 and through the handgrip. Each of the cables 72 is then routed from the other end 82 of the handgrip 76 and connects to one of the brake levers 78. Each of the levers 78 can be pivoted, i.e., squeezed, toward the handgrip 76, which in turn will pull on a wire (not shown) passing through a sheath 84 of the respective cable 72 to actuate the corresponding brake assembly 74 described below. In this example, each of the brake levers 78 includes an independent adjuster 86. Each adjuster 86 can be manipulated, such as by rotation, to take up or let out slack in the wire so as to adjust the sensitivity of the corresponding cable 72. Thus, the user can adjust the sensitivity of either one or both of the brake levers 78 as to how quickly the brake assemblies 74 actuate upon movement of the levers. If desired, the user can independently adjust each of the brake assemblies to a different sensitivity, depending on the needs of a particular use for the riding device 30, brake wear, or the like.

Figure 6:
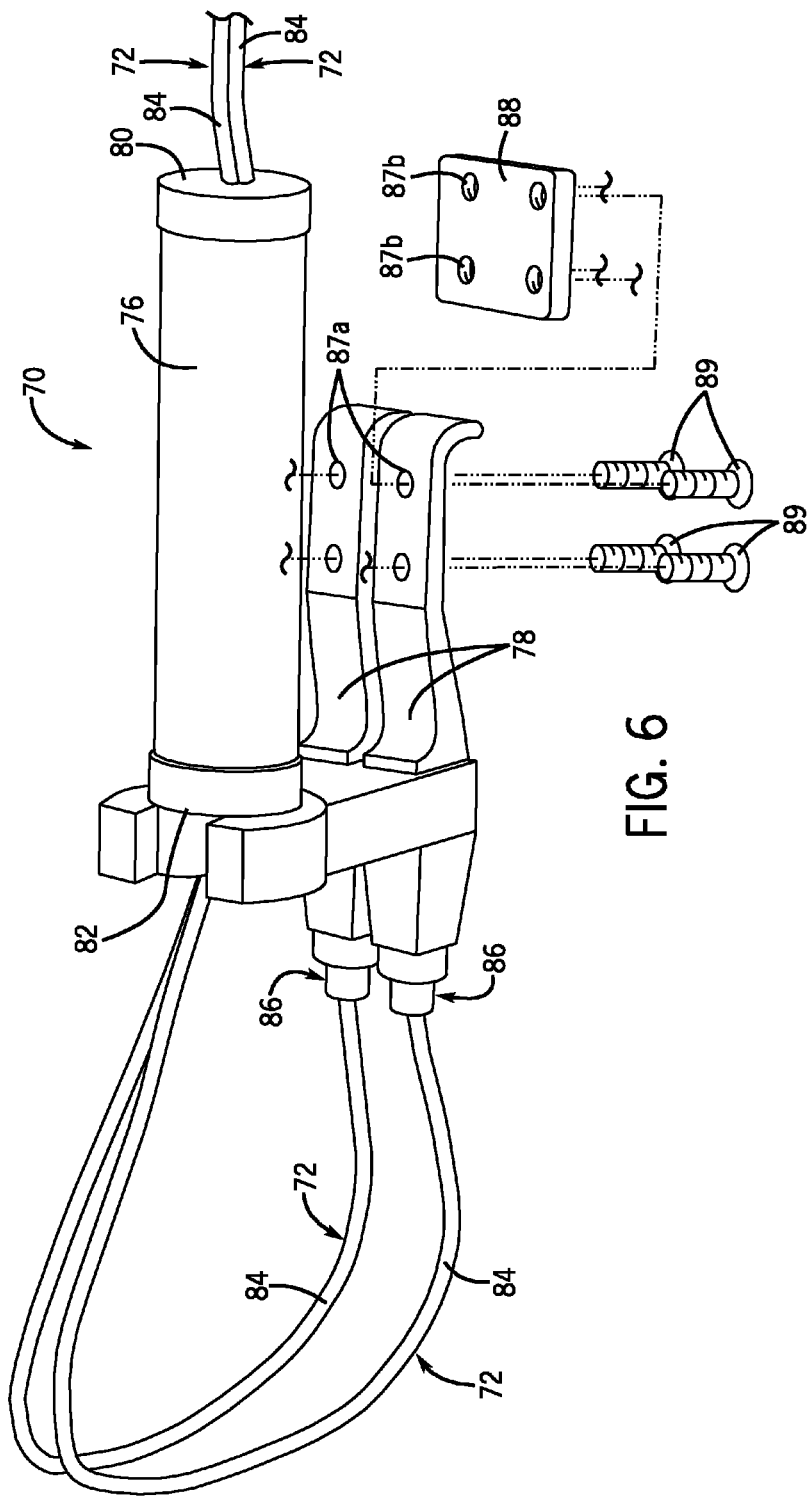
FIG. 6 shows a partial exploded view of a hand brake lever of the riding device shown in FIG. 2.

As will be evident to those having ordinary skill in the art, the configuration and construction of the hand held actuator 70 and the levers 78 can vary within the spirit and scope of the present invention. The handgrip 76 can be configured to provide an ergonomic surface shape, a padded or tacky gripping surface, and the like. The construction and routing of the cables can also vary as can the adjuster mechanism for each cable. The actuator 70 can be primarily formed of plastic, composite, aluminum, stainless steel, or other suitable materials. As shown in FIG. 6, a yoke 88 can be optionally installed on the brake levers 78 so that the levers operate in concert during use. In one example, the yoke 88 can be removably installed using fasteners 89 mounted through holes 87a in the levers and holes 87b in the yoke to connect and link each of the brake levers 78, if needed or desired by the user.

Figure 7:
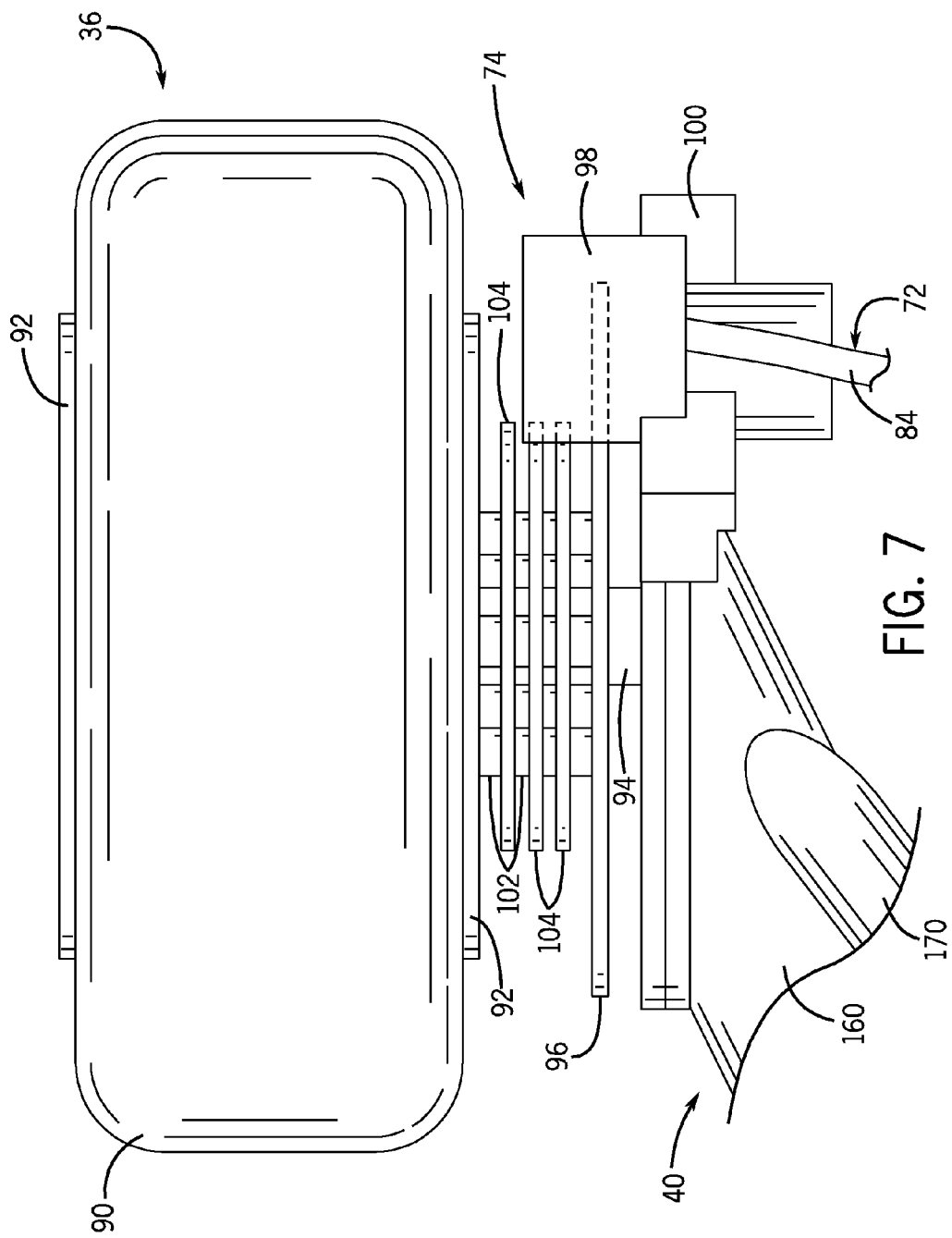
FIG. 7 shows a top view of one rear wheel and brake assembly of the riding device shown in FIG. 2.

With reference to FIGS. 2, 3, and 7, each rear wheel 36 has a pneumatic tire 90 mounted to a wheel hub 92. The hub 92 is mounted to an axle 94 carried on part of the turning tail 40, as described below. Each brake assembly 74 in this example is in the form of a disc brake and has a brake rotor 96 mounted for rotation with the wheel 36. The rotor 96 is captured between brake pads (not shown) retained on a brake caliper 98 connected to one of the cables 72. The brake caliper 98 is mounted to a caliper plate 100 that holds the caliper in place when assembled. As shown, each of the brake calipers 98 is carried on the inner side of the corresponding wheel 36. When the brakes are applied during use, breaking friction between the rotor and brake pads will generate a significant amount of heat that can be harmful to the touch and that can cause damage to the brake system components. To help dissipate some of the heat generated during use, each brake assembly 74 in this example has a heat transfer or heat sink arrangement. A plurality of spacers 102 separate a plurality of cooling discs 104 that are all mounted concentric with the axle 94 between the wheel 36 and the turning tail 40 to which it is mounted. Heat from the brake assembly 74 can be transferred via the spacers 102 to the cooling discs 104, which can help dissipate heat to air that flows over the cooling discs during use of the riding device 30.

In operation, the user can squeeze the appropriate brake lever 78 on the hand held actuator 70, which in turn will pull on the wire of the corresponding cable 72. The cable 72 will thus actuate the pads of the brake caliper 98 and squeeze the rotor 96 to brake or slow rotation of the rear wheel 36. The brake assemblies 74 disclosed herein, similar to the bindings 48, 49 described above, can be formed of essentially conventional components such as those used on mountain bikes, motorcycles, scooters, or the like. As will be evident to those having ordinary skill in the art, the configuration and construction of the brake system components can vary within the spirit and scope of the present invention from the example shown and described herein. Also, the components of the wheel 36 can also vary. The size and configuration of the tire 90 can vary greatly, as can the type of rolling surface or tread on the tire. The configuration and construction of the wheel hub 92 can also vary. In one example, the hub can be made of plastic or compound the material so as to be lightweight yet sufficiently strong. The tire can be made of rubber or other suitable elastomer-type materials.

With reference to FIGS. 2-4 and 8, the front arm 38 of the body or frame structure 32 is generally a lengthy or elongate element having a forward or free end 110 and a back end 112 opposite the free end. In this example, the front arm 38 is formed as a generally V-shaped structure with two legs 114 joined or welded together at the free end 110 and spaced apart at the back end 112. The back end of each of the legs 114 in this example carries a cylindrical bushing 116. The cylindrical bushings 116 are concentrically aligned with one another and define an arm axis A. The front arm 38 can pivot about the arm axis A and thus can move upward and downward at the free end 110 relative to the platform structure 42, as described in greater detail below. In this example, the arm axis A is oriented generally horizontally and also laterally across the device 30, perpendicular to a lengthwise axis L of the front arm 38. The components of the platform structure 42, the front arm 38, and pivot joint components at the arm axis A define a portion of a joint part beneath the platform structure. This portion of the joint part creates the pivoting movement of the front arm 38.

Figure 8:
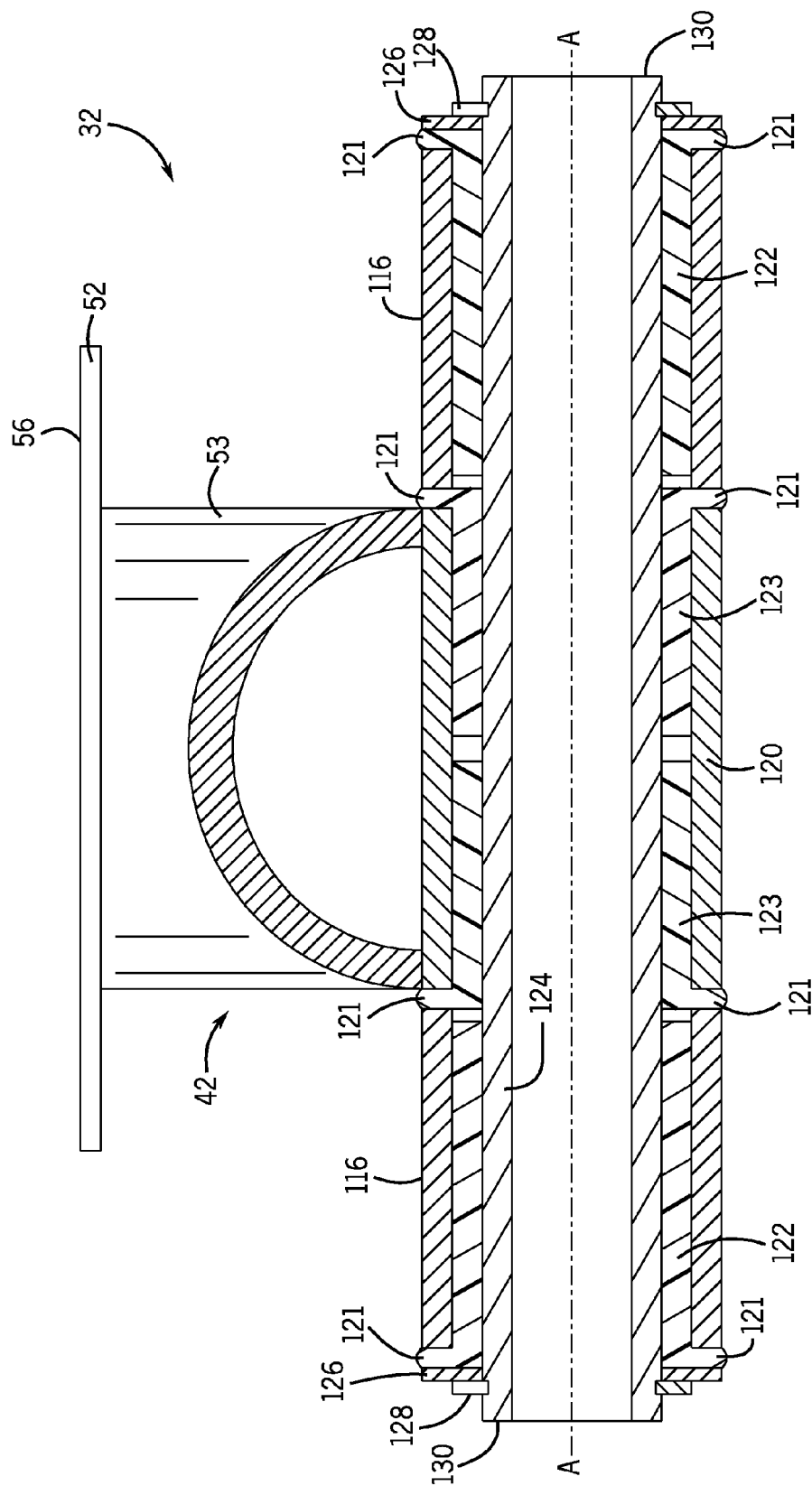
FIG. 8 shows a width-wise cross-section taken along line 8-8 in FIG. 4 of a front arm pivot of the riding device.

In this example, as noted above, the front support tube 51 of the platform structure 42 supports the front footpad 50 at one end. The support tube 51 also carries a central bushing 120 at its opposite end. The central bushing 120 is also oriented horizontally and extends laterally side to side. When assembled, the central bushing 120 seats between and concentric with the two front arm bushings 116 as shown in FIG. 8. Cylindrical sleeves or bearings are inserted in the arm pivot bushings. One bearing sleeve 122 is inserted in the outer end of each of the respective arm bushings 116 and two sleeve bearings 123 are inserted in the opposite ends of the central bushing 120 in this example. An arm pivot 124 or pivot axle is inserted through the bushings 116, 120 and bearings 122, 123. Washers 126 and fasteners 128, such as threaded nuts, cotter pins, C-clamps, snap rings, or the like, can be utilized to secure the exposed ends 130 of the pivot tube 124 in place. Flanges 121 on each of the sleeve bearings 122 and 123 are captured between each pair of adjacent bushings 116 and 120 and each washer 126 and bushing 116 to prevent direct contact of the bushings and to reduce friction thereat. During use, the front arm 38 can pivot relative to the central bushing 120 of the platform structure 42 about the arm axis A.

As with other features of the device, the configuration and construction of the front arm 38, the pivot and bearing components defining the arm axis A, and the support tube 51 can vary from the example shown and described herein. In one example, the legs 114 of the front arm 38 and the bushings 116 can be fabricated from aluminum and can be welded or otherwise connected to one another. Likewise, the frame section or support tube 51, as well as the footpad 50, can be formed of aluminum and can be welded together. In another example, the frame section or support tube 51 and/or the front arm 38 can be formed of high strength composite or reinforced composite materials, such as carbon fiber. In one example, the legs 114 of the front arm 38, as well as the frame section or support tube 51, can be hollow, tubular components or can be solid components. In yet another example, the front arm 38 can include a single lengthwise element instead of the V-shaped, dual leg construction disclosed herein. Still further, the foot pad 50 can be a flat plate either fastened or welded to the hollow frame section or support tube 51 as in this example. Alternatively, the footpad 50 can be a machined surface on one end of a solid frame section component.

As shown in FIGS. 2-4, the front wheel 34 is positioned on the free end 110 and of the front arm 38. In this example, a front fork 140 is mounted to the free end 110 and has a pair of fork plates or bars 142 spaced apart from one another and projecting forward from the front arm 38. The front wheel 34 is positioned between the bars or plates 142. An axle 144 extends through openings 146 in the tips 148 of the fork plates 142. The front wheel 34 is constructed similarly to the earlier described rear wheels 36. In this example, the front wheel 34 generally has a tire 150, also of a typical pneumatic construction. The tire 150 is again mounted to a hub 152, which is in turn mounted for rotation on the axle 144. When the wheel and the axle are installed on the fork, washers and fasteners 154 can again be utilized to retain the wheel 34 and axle 144 on the front arm 36. As with the rear wheels 36, the configuration construction of the tire 150 and hub 152 of the front wheel 34 can vary within the spirit and scope of the present invention. Similarly, the construction of the front fork 140 can also vary, as can the means of attaching the front wheel 34 to the front arm 38.

With reference to FIGS. 2-4 and 9, details and features of the turning tail 40 and its connection to the body 32 are now described. In the disclosed example, the turning tail 40 also has a generally V-shaped configuration with two rear legs 160 joined together at a forward end 162 of the turning tail. The rear legs 160 extend rearward from the joined forward end 162 and are spaced apart from one another at their respective rear ends 164. One or more gusset plates 165 can be connected to each of the rear legs near the respective forward ends 162 as shown. Such gusset plates can be utilized to add stability and strength to the turning tail structure.

A first turning plate 166 is provided at the forward end 162 of the turning tail 40. In this example, the first turning plate 166 is connected to the ends of each of the rear legs 160. The first turning plate 166 is a circular plate with a flat surface 168 that faces downward, but is tilted slightly upward and forward relative to a horizontal reference. A turning tube or cylinder 170 is connected to the back or top side 172 of first turning plate 166. The cylinder 170 is positioned at the center of the plate, is oriented perpendicular to the flat surface 168 and extends up from the plate. One end of a pair of support struts 174 is connected to an upper end of the turning cylinder 170. Opposite ends of the struts 174 are each connected to a respective one of the rear legs 160 near the rear ends 164. Thus, the support struts 174 are also arranged in a V-shaped configuration, though the struts do not lie in the same plane as the rear legs.

In the disclosed example, the turning tail 40 can again be formed of a plurality of aluminum components that are welded together in the configuration as shown and described herein. Alternatively, the turning tail 40 can be formed of composite materials or reinforced composites, such as carbon fiber or the like. The arrangement of the rear legs 160, the struts 174, and the first turning plate 166 can also vary from the example shown and described herein. In this example, the struts 174 help to rigidly support the turning cylinder 170. The combination of the gusset plates 165 with the V-shaped arrangement of the struts 174 and rear legs 160, and their connection to the cylinder 170, creates a strong cage-like structure that can withstand the rigors of using the riding device 30 on rough, uneven terrain.

Figure 10:
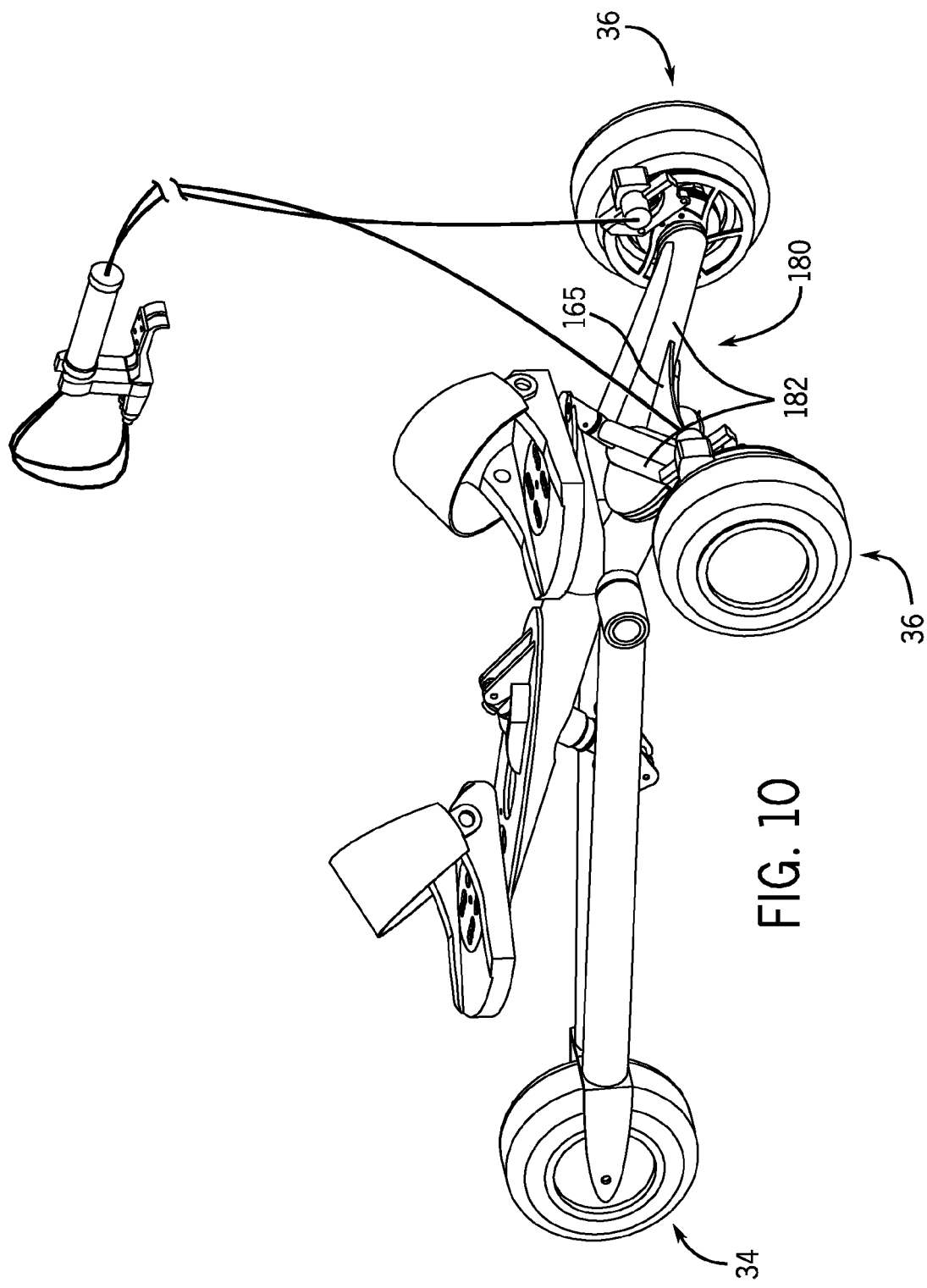
FIG. 10 shows a perspective view of another example of a snowboard simulation riding device constructed in accordance with the teachings of the present invention.
Figure 11:
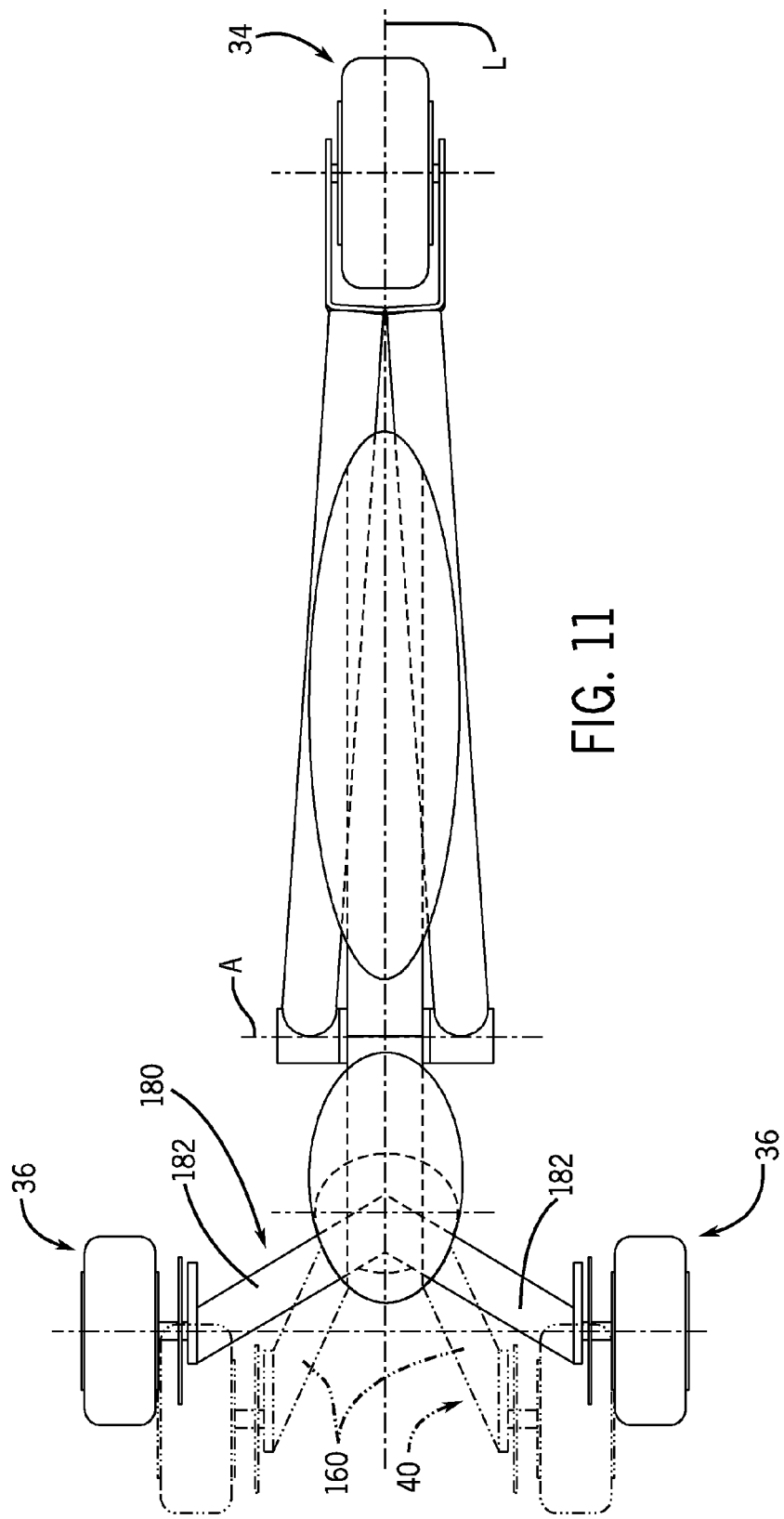
FIG. 11 shows a top view of the riding device shown in FIG. 10.

As noted above, each rear wheel 36 is connected to an axle 94. In this example, the axle 94 for each wheel 36 is carried by a portion of the turning tail 40. Specifically, the riding device 30 has a pair of stub axles 94, one projecting outward from a respective one of the rear legs 160 at or near the corresponding rear ends 164. The spacing of the rear wheels 36 can be determined by the spacing of the rear legs 160 at their respective rear end 164. This spacing can be varied as desired. In one example, an alternate rear turning tail 180 is illustrated in FIGS. 10 and 11 on a riding device otherwise identical to the riding device 30. In this alternate example, the turning tail 180 has a pair of rear legs 182 that are spread wider apart at a greater angle in comparison to the rear legs 160 of the turning tail 40. Thus, the rear wheels 36 in this alternate example are spread further apart from one another. Such a construction is but one of many possible alternative designs for the turning tail 40. A wider rear wheel base may provide more stability for the device during use.

Figure 9:
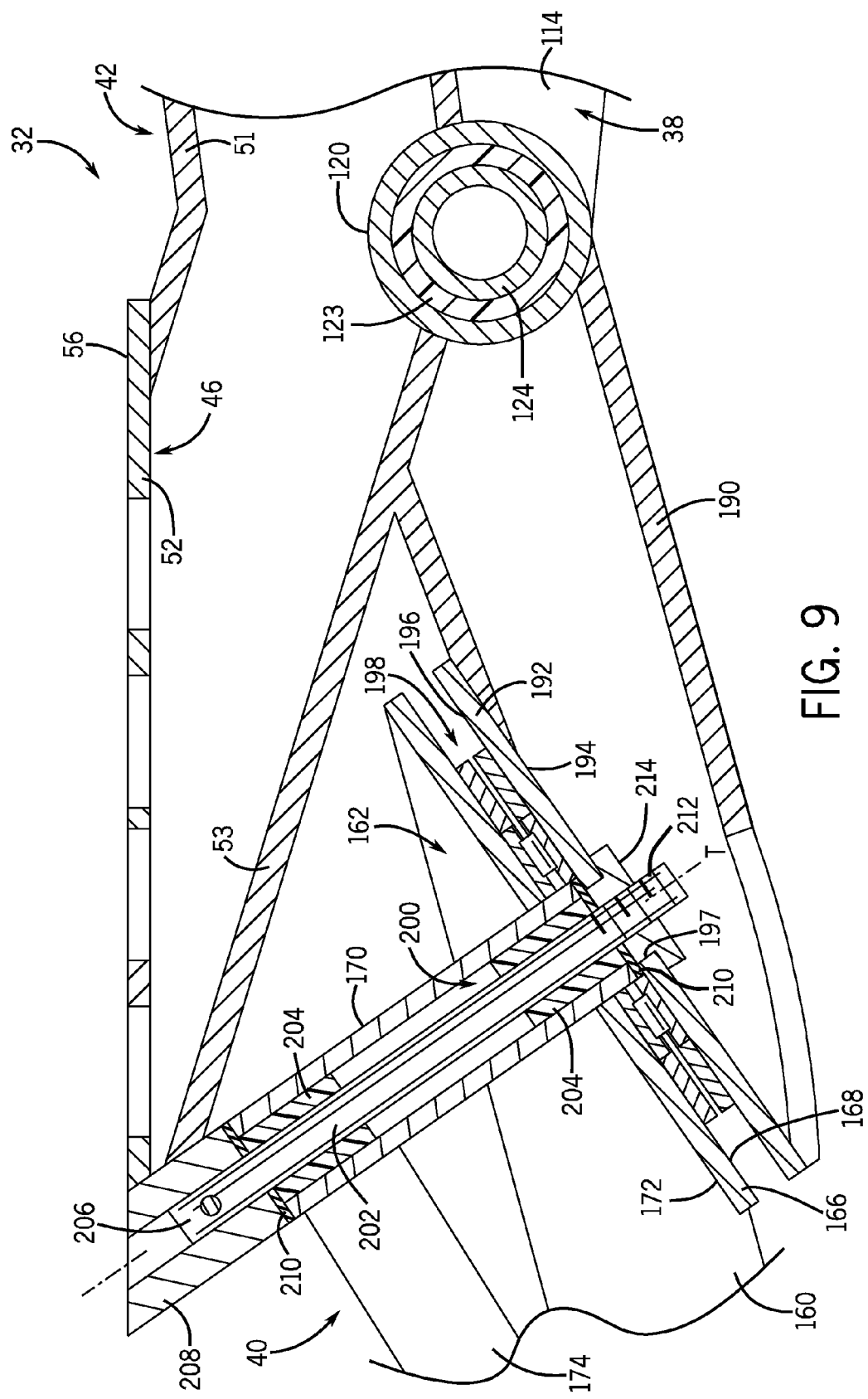
FIG. 9 shows a lengthwise cross-section taken within the circle 9-9 in FIG. 4 of a rear turning tail pivot of the riding device.

With reference to FIGS. 3 and 9, the body or frame structure 32 has an extension 190 connected to the central bushing 120. The extension 190 extends longitudinally rearward and downward from the central bushing 120 in this example. A second turning plate 192 is connected to the free end of the extension 190 with a backside or bottom side 194 of the turning plate 192 joined or welded to the extension. The second turning plate 192 has a flat surface 196 that faces upward and that tilts rearward relative to a horizontal reference. The second turning plate 192 is, like the first turning plate 166, is circular and has a center opening 197 that is positioned concentric with the turning cylinder 170. When the turning tail 40 and platform section 42 are assembled to one another, the flat surfaces 168, 196 of the turning plates 166, 192 are brought together in confronting, close proximity to one another. A thrust bearing assembly 198 is sandwiched between the flat surfaces 168, 196. The thrust bearing assembly 198 provides a low friction joint between the two plates 166, 192 and permits relative rotation thereof. Specifically, the second turning plate 192 is held stationary on the platform section 42, whereas the first turning plate 166 on the turning tail 40 can pivot or rotate relative to the second turning plate while remaining parallel to one another, as discussed in greater detail below. The thrust bearing assembly 198 can include ball bearings, roller bearings, or other suitable surface friction reducing elements, as desired. Alternatively, other types of friction reducing elements may be utilized in place of the thrust bearing assembly 198.

A needle bearing assembly 200 is housed within the turning cylinder 170. Specifically, the bearing assembly 200 has a bearing shaft 202 extending along the center opening of the turning cylinder 170. The bearing shaft 202 defines a turning axis or tail axis T about which the turning tail 40 can pivot or turn relative to the platform section 42. In this example, the tail axis T is perpendicular to a plane of the first and second turning plates 166, 192 and is concentric with the center opening 197 and cylinder of the turning plates 166, 192 and turning 40. A pair of bushings 204 is disposed, one each at opposite ends within the cylinder 170 and support the bearing shaft 202 therein. An upper end 206 of the pivot shaft 202 is fixed and retained in a cylinder cap 208 carried on the rear end of the rear foot landing 46. The cylinder cap 208 has an axis oriented concentric with the turning cylinder 170 and turning axis T. A washer is positioned at each end of the needle bearing assembly 200. One of the washers 210 is between the upper end of the turning cylinder 170 and the cylinder cap 208 and the other washer 210 is between the lower end of the turning cylinder 170 and the second turning plate 192. The needle bearing assembly 200 is sandwiched between the washers 210, which prevent direct contact between the adjacent components and the needle bearing and provide a bearing function thereat. The turning cylinder 170 can rotate relative to the stationary cap 208 when the turning tail is turned, as described below about the turning axis T. A lower end of the bearing shaft 202 has male threads 212 thereon and extends through the center opening 197 of the second turning plate 192. A threaded fastener 214 has mating female threads and is screwed onto the threads 212 of the bearing shaft 202. With the upper end of the bearing shaft 202 fixed in the cap 208 and the lower end of the shaft secured by the fastener 214, the needle bearing assembly 200 and the first and second turning plates 166, 192 are secured to one another to retain the components in the assembled state depicted in FIG. 9.

Again, components of the platform structure 42, the turning tail 40, and turning pivot components at the tail axis T define another portion of the joint part beneath the platform structure. This portion of the joint part creates the turning movement of the turning tail 40. As utilized herein, the arm pivot 124 and related components and the turning cylinder 170, turning plates 166, 192 and related components define the joint part beneath the platform structure. The joint part defines the two different axes of motion for the body 32 of the riding device 30. The front arm 36 moves up and down relative to the platform structure, pivoting about the arm axis A. The turning tail 40 rotates or turns about the turning axis T relative to the platform structure and front arm 36. As described in greater detail below, the geometry of the body 32 results in a unique turning motion and camber for the riding device 30.

As will be evident to those having ordinary skill in the art, and as with other components of the disclosed snowboard simulation riding device, the components of the joint assembly can be separately manufactured and assembled to one another using fasteners or the like. Alternatively, various compliments of the joint assembly can also be formed of aluminum or other metal material and welded together as in this example. The turning plates can be welded to the extension and turning tail in a conventional manner. These components can also be made of aluminum, if desired. Alternatively, the components can be made of various composite materials or reinforced composites, such as carbon fiber, or the like, and joined to one another in a suitable manner.

Figure 12:
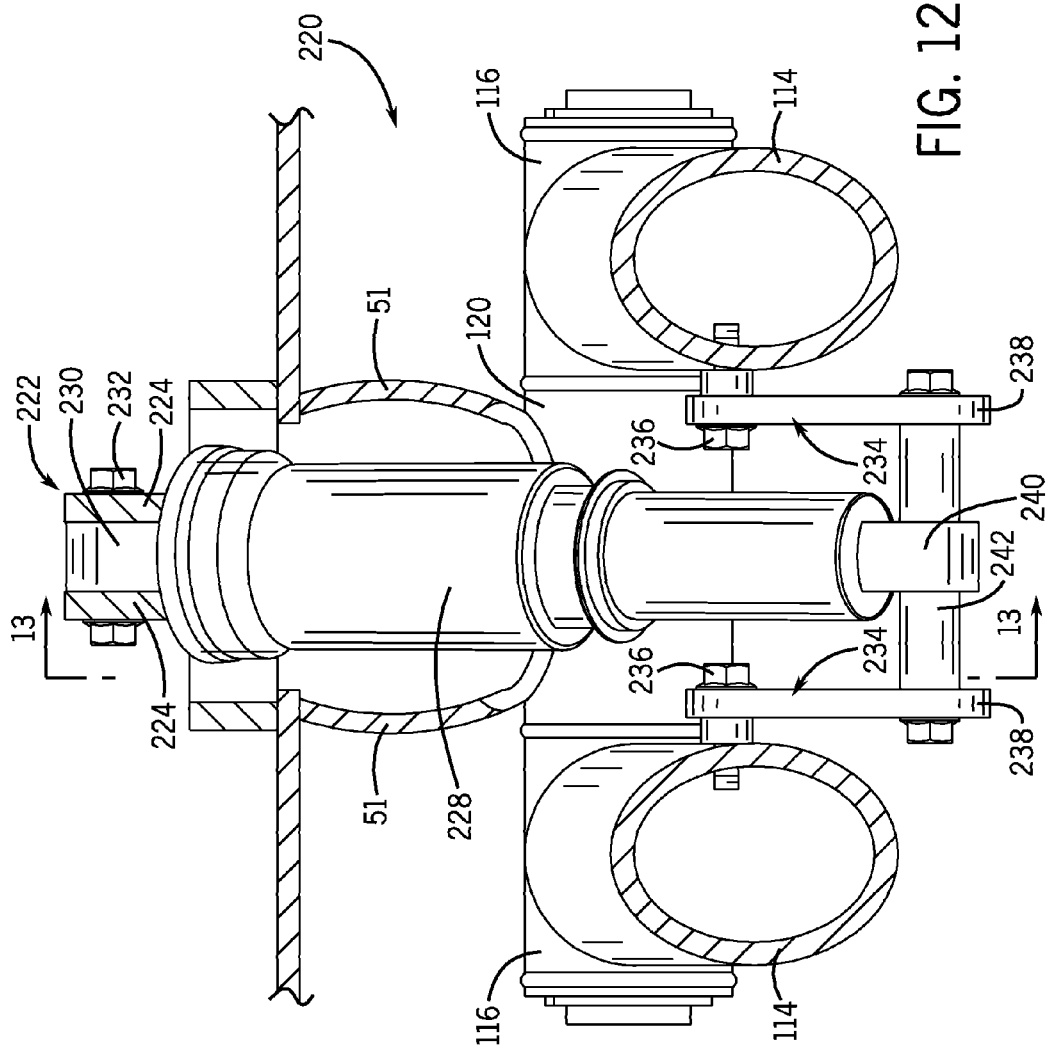
FIG. 12 shows a cross-section taken along line 12-12 in FIG. 4 of a suspension mechanism for the riding device shown therein.

With reference to FIGS. 3, 4, and 12, the riding device 30 in this example also has a suspension mechanism 220. The suspension mechanism 220 can be provided to absorb some of the impact forces that the device will see during use on rough terrain. In this example, the suspension mechanism 220 has an upper bracket 222 carried on a rear end of the front foot landing 44. In this example, the upper bracket 222 is a trunnion-style bracket with two spaced apart plates 224 and fastener openings 226 in each plate. The suspension mechanism 220 also has a shock absorber 228 with an upper end 230 on a cylinder 231 of the shock absorber. The upper end 230 is secured between the plates 224 by a fastener 232. The upper end 230 is securely held by the upper bracket 222 and yet can pivot relative to the bracket.

The suspension mechanism 220 in this example also includes a pair of links 234 mounted one to the inner side of each of the legs 114 on the front arm 38. The links 234 are thus between the legs 114 and are also spaced apart from one another. In one example, the links 234 are L-shaped with each free end secured by a fastener 236 to the respective leg 114 on the front arm 38. Each of the links 234 in this example also has an elbow 238 with an opening 239 therein. The shock absorber 228 also has a lower end 240 on a shaft 241 that is slidable relative to the cylinder 231 as is known in the art. The lower end 240 of the shock absorber 228 is secured between each of the elbows 238 by an elongate shaft/fastener 242 extending between the elbows 238 and through the lower end. Again, the lower end 240 of the shock absorber 228 is securely held by the links 234 to the front arm 38 and yet can pivot relative to the links. In this example, the shock absorber 228 is mounted along the center line L of the front arm 38 between the legs 114.

In one alternate example, the links 234 can be integrally connected to the front arm 38, such as by being cast with the legs 114. In another alternate example, the links 234 can be separately fabricated and welded to the legs. However, in the present example, the links 234 are removably mounted to the front arm 38 by the fasteners 236. Thus, the links 234 can be removed from the legs 114 and replaced or swapped with other links as needed or desired.

Figure 13:
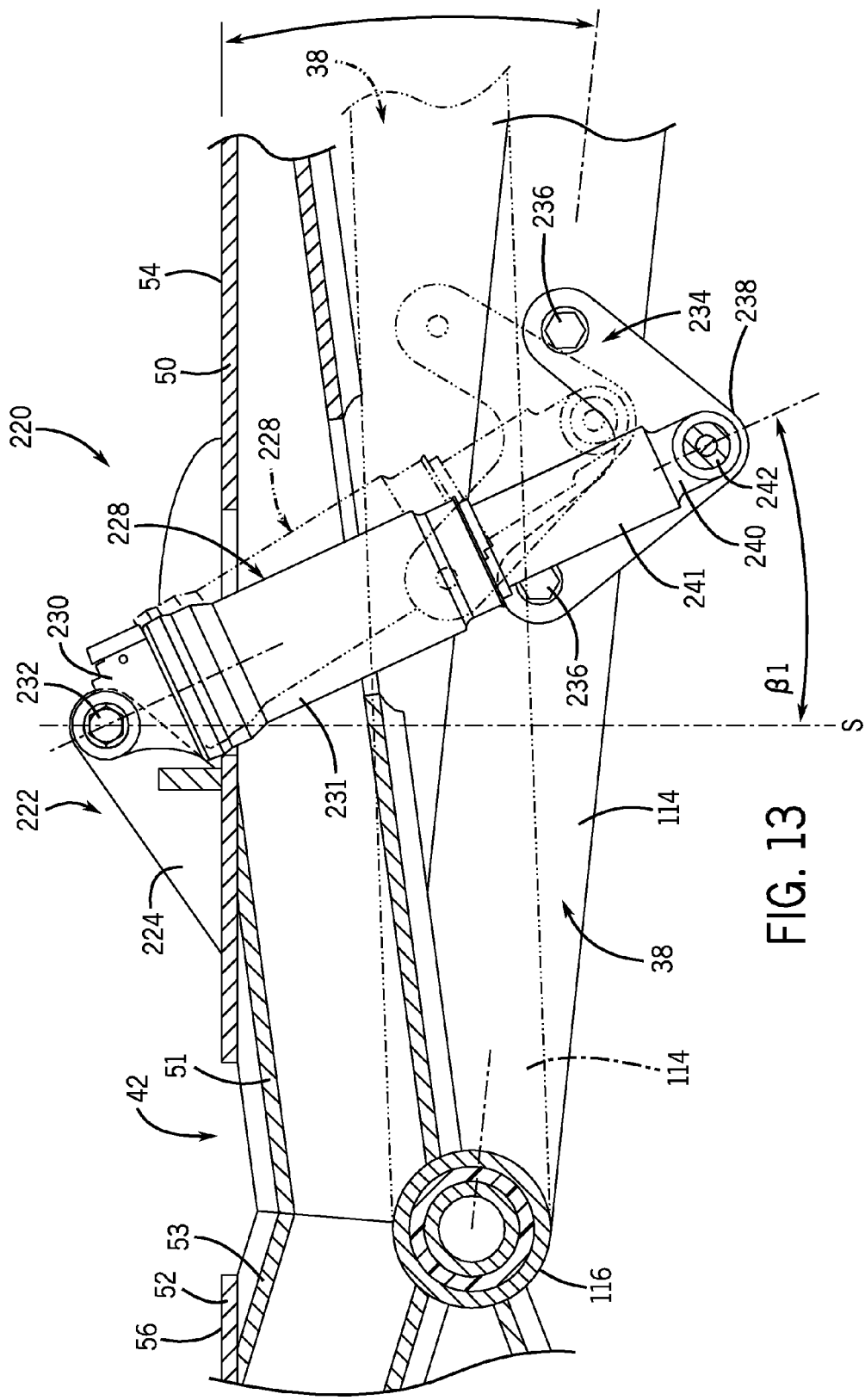
FIG. 13 shows a cross-section taken along line 13-13 in FIG. 12 of the suspension mechanism.
Figure 14:
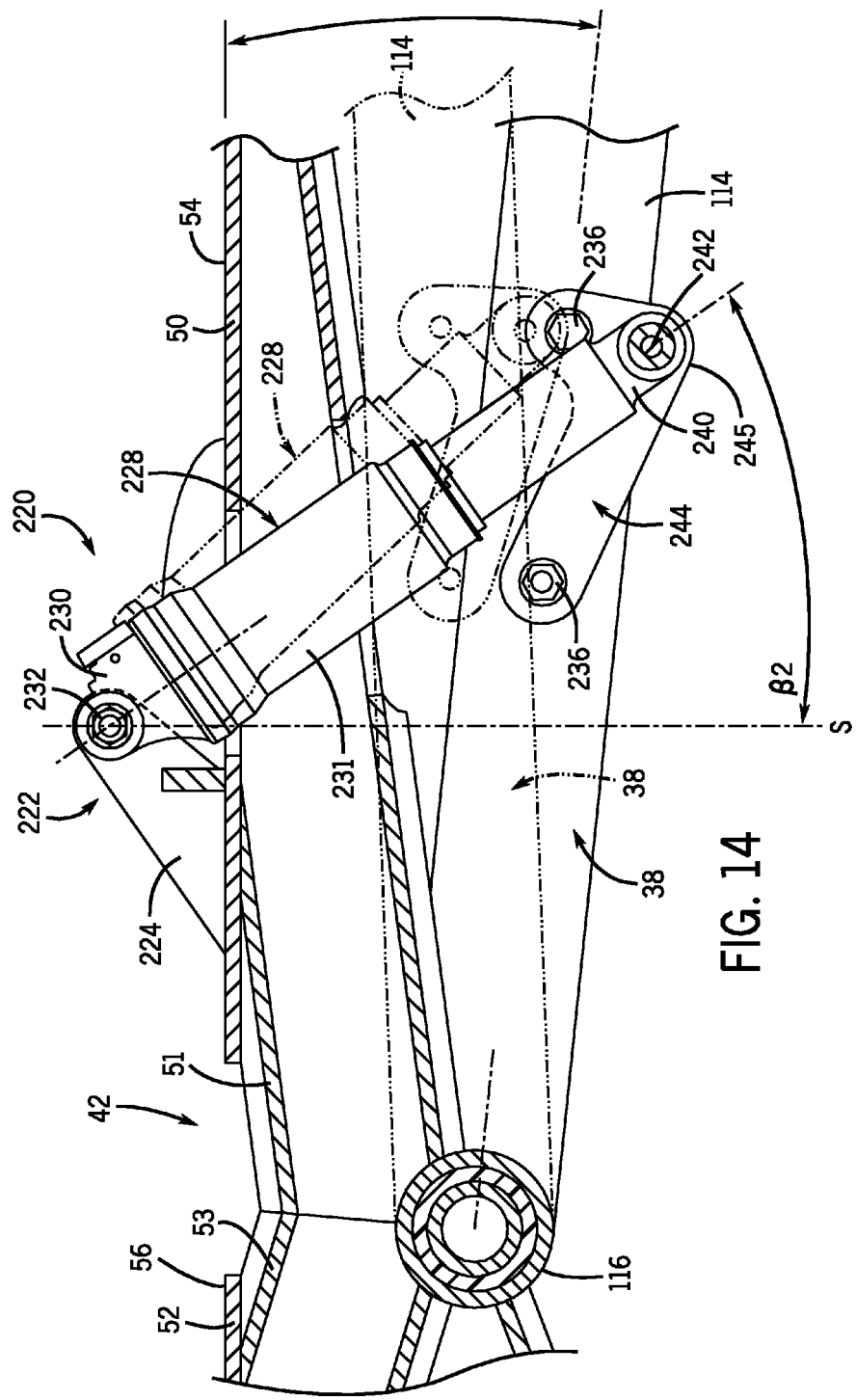
FIG. 14 shows a cross-section, similar to FIG. 13, but showing a modification to the suspension mechanism.
Figure 15:
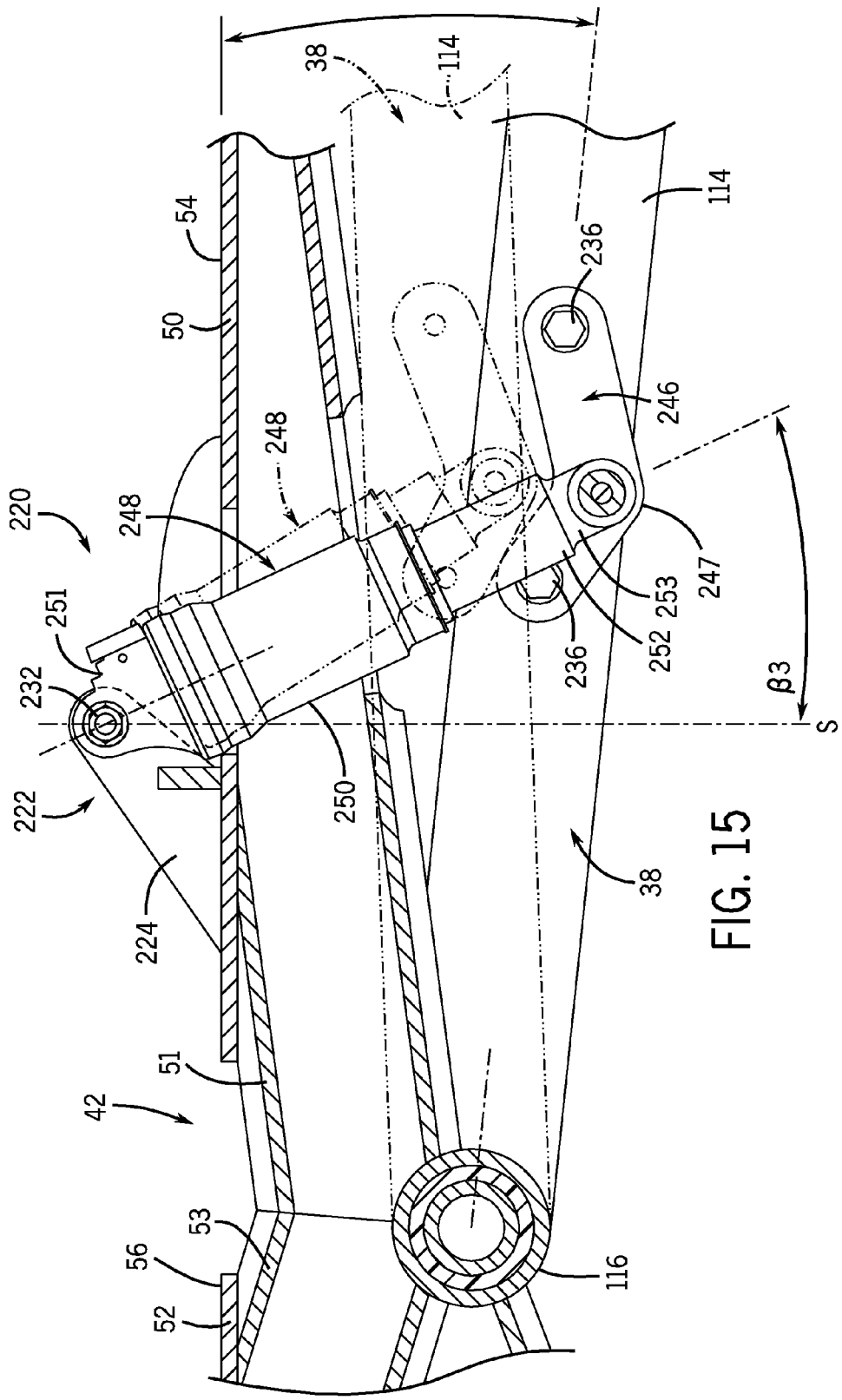
FIG. 15 shows a cross-section, similar to FIG. 13, but showing another modification to the suspension mechanism.

In one aspect of the disclosed invention, an array or set of different links can be provided for a user to optionally select and mount to the riding device 30. The links in the array or set can be different in size and shape so as to change the position of the elbow 238 and, as a result, change the position of the lower end 240 of the shock absorber 228 relative to the upper end 230. By doing so, the user can alter the performance characteristics of the suspension mechanism 220. The user can selectively adjust or tweak the performance of the snowboard simulation riding device 30 according to their needs at a given time. FIGS. 13-15 illustrate just three different examples, of many possible variations of alternate shaped links that can be utilized.

FIG. 13 shows the link 234 mounted to the riding device 30 and connected to the shock absorber 228. The suspension mechanism is shown in solid line in a normal, at rest position with the shock absorber 228 extended. The suspension mechanism 220 is shown in phantom line during use with the shock absorber 228 compressed. The front arm 38 pivots about the arm axis A relative to the platform structure 42. The front arm 38 thus swings through an arc. A tangent line S is shown in FIG. 13, the line being tangent to the arc of travel of the front arm. If the shock absorber 228 were mounted along the tangent line S, the linear travel or stroke of the shock absorber would be very short within the geometry of the structure of the body 32. The shock absorber 228 would also thus have to be quite resistant to motion in order to adequately absorb impact in such an orientation. The shock absorber would very likely be much too stiff in this orientation during use of the riding device. 30.

The upper end 230 of the shock absorber 228 is mounted along the tangent line S. However, the lower end 240 is mounted away from the tangent line S. The shock absorber is thus oriented at an angle $\beta 1$ relative to the tangent line S. The shaft 241 of the shock absorber 228 will have a longer stroke in this orientation. The force vectors acting on the shock absorber 228 upon movement of the front arm 38 are also affected. The shock absorber can be relatively stiff and yet function adequately to absorb and dampen impact on the riding device during use when the shock absorber is oriented at an angle relative to the tangent line S.

FIG. 14 shows the shock absorber 228 connected to an alternate pair of links 244, selected from the array or set of links, and mounted to the front arm 38 and platform structure 42. The links 244 have elbows 245 that position the lower end 240 of the shock absorber 228 further rearward than the links 234. The links 244 thus will change the force vectors of the suspension mechanism 220 in this example by increasing the angle $\beta 2$ between the shock absorber shaft travel direction and the tangent line S. FIG. 15 shows yet another example of an alternate pair of links 246 with elbows 247 that are again positioned different in comparison to the prior examples. In this example, the shock 228 is also replaced by a different shock absorber 248. The shock absorber 248 has a smaller cylinder 250 with an upper end 251 connected to the bracket 222 and shorter shaft 252 with a lower end 253 connected to the links 246. The combination of the links 246 and shorter shock absorber 248 produce a shorter stroke for the suspension mechanism. In this example, the alternate links 246 and alternate shock absorber 248 again will change the force vectors of the suspension mechanism 220 via the shorter stroke and the different angle $\beta 3$ between the shock absorber travel direction and the tangent line S.

Figure 16:
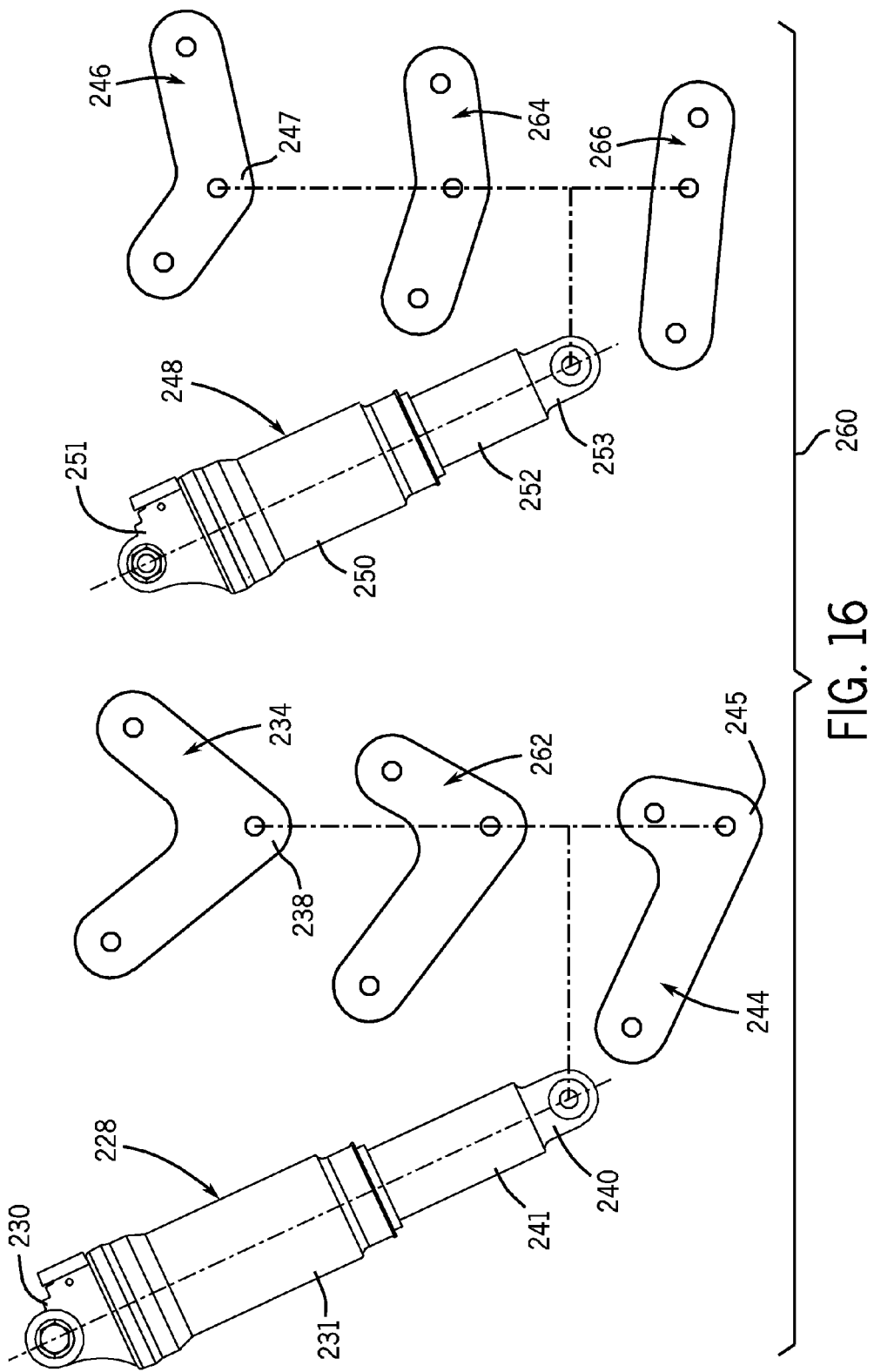
FIG. 16 shows one example of a suspension kit including multiple interchangeable suspension components for the riding device of FIGS. 1-4.

In one example, the riding device 30 can be provided with a suspension kit 260 as shown in FIG. 16. The kit 260 can include a plurality of different shock absorbers and an array or set of different pairs of links for each shock absorber. Each shock absorber and link pair can be configured to mount to the legs 114 and brackets 222 using the same mounting opening or hole locations. In the example shown, the kit 260 includes the two above-described shock absorbers 228 and 248. The kit could also include additional shock absorbers or only one shock absorber if desired. The shock absorber 228 is shown having an array of three different link pairs including the above-described links 234 and 244, and another alternate pair of links 262. The shock absorber 248 is shown having an array of three different link pairs including the above described links 246 and additional alternate links 264 and 266. Again, the kit 260 can be provided with more or fewer than three pairs of links in each array. The kit 260 can also be provided with multiple shock absorbers but only one set of links.

As illustrated, the configuration of the links can be altered to change both the stroke of the shock absorber and the orientation or angle of the shock absorber travel direction relative to the movement direction or tangent line S of the front arm 38. Depending on the size, shape, and orientation of the links, the lower end of the shock absorber can be positioned at any desired location or position relative to the tangent line S. The greater the distance from the tangent line S, the more indirect affect the shock absorber will have on absorbing impact loads on the device during use. The riding device 30 can be provided with an array of pairs of links numbering two or more that are selectable by the user to alter the performance characteristics of the suspension mechanism 220. If desired, the shock absorber can also be swapped out to further alter the performance characteristics of the suspension mechanism.

As will be evidenced those having ordinary skill in the art, the suspension mechanism components and characteristics can vary within the spirit and scope of the present bench. In one example, the shock absorber can be a hydraulic shock absorber that dampens movement in both directions. Thus, a spring may be used in conjunction with the shock absorber if desired in order to achieve suitable performance. In another example, one or more stiff springs may be utilized without also employing any other dampening or shock absorbing mechanism, other than the springs. In still another example, the shock absorber, as disclosed herein, can be a pneumatic or air shock absorber that essentially dampens forces in one direction, i.e., under compression. Thus, as in this example, no suspension spring need be utilized. If desired, the air pressure within the shock absorber can be regulated so as to vary the degree of stiffness. This can be done by adding or releasing pressure within the same shock absorber or swapping one shock absorber with another of a different stiffness.

The configuration and mounting location of the upper bracket 220 can also vary from the example shown and described herein. Similarly, the configuration and construction of the links and how the links are mounted to the legs 114 or other parts of the device 30 can also vary from the examples shown and described herein. Still further, the suspension mechanism 220 in this example is mounted on the centerline or central axis L of the front arm 38, as noted above. In other examples, the suspension mechanism can be mounted to one side or the other of the riding device 30, or two such mechanisms can be utilized, one on each side of the device.

The disclosed snowboard simulation riding device 30 provides for improved turning performance and more closely simulates the function and performance of a snowboard, though operated on dry land and rough terrain. The configuration and construction of the joint assembly between the rear wheels, the front wheel and the riding platform results in the device turning by articulated steering. The riding device can be turned rather easily by a user simply by maneuvering their body and leaning in one direction or another. The device will turn in a manner that achieves greater control for the user as well as greater stability.

Figure 17:
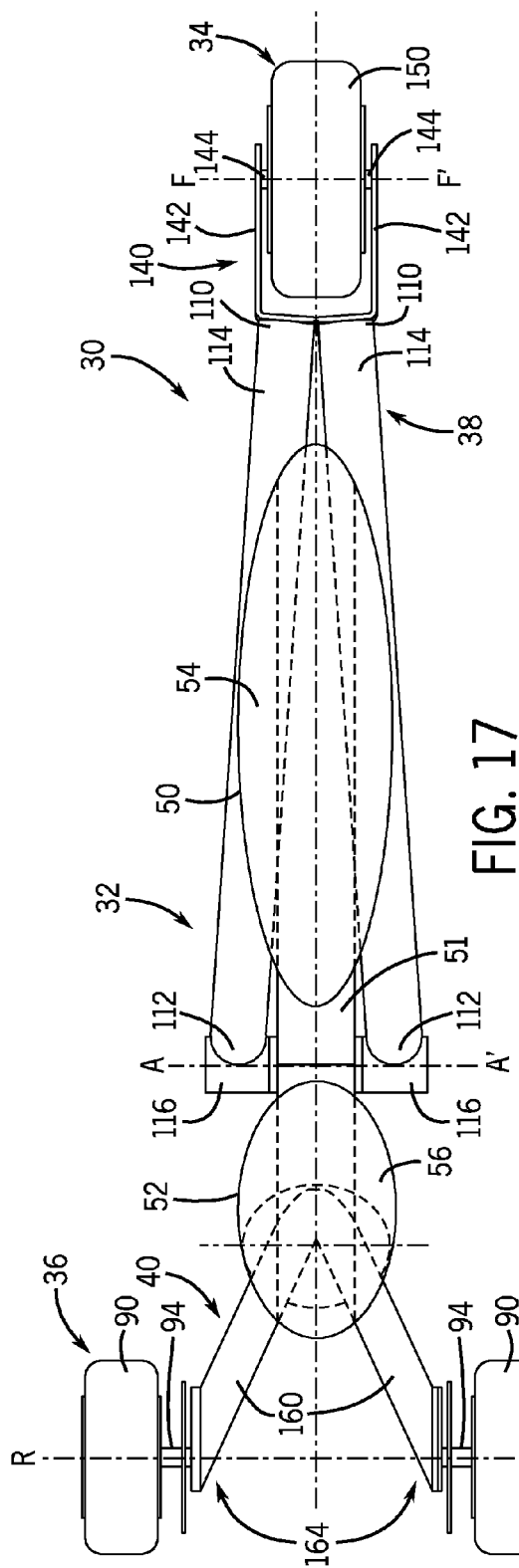
FIG. 17 shows a top view of the riding device shown in FIG. 2 and depicting various reference points on the device while the device is in a straight line travel orientation.
Figure 18:
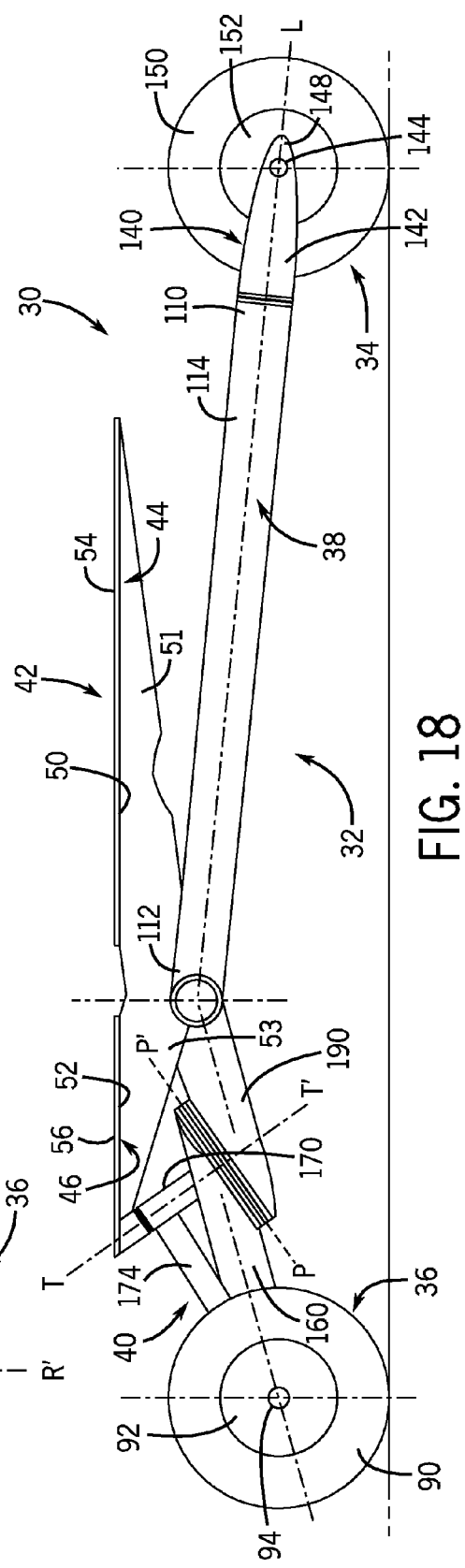
FIG. 18 shows a side view of the riding device shown in FIG. 17, also depicting various reference points on the device.

FIGS. 17-20 show how the riding device 30 turns and how articulated steering is produced by the device. In these figures, some of the components of the riding device 30 have been removed for ease of illustration of the steering of the device. With reference to FIGS. 17 and 18, the riding device 30 is in a straight line, forward rolling configuration. In this configuration, the rear wheels 36 roll on a rear wheel axis R and the front wheel 34 rolls on a front wheel axis F. The front and rear wheel axes R and F are parallel to one another, both when viewed from the top of the device (FIG. 17) and when viewed from the side of the device (FIG. 18). The lengthwise axis L of the front arm 38 is oriented perpendicular to both of the wheel axes R and F. Likewise, the turning tail 40 has a lengthwise center axis TT. In this straight line orientation, the lengthwise axes L and TT are aligned with one another, i.e., parallel to one another, but only when viewed from the top. Likewise, the front arm pivot axis A is perpendicular to the lengthwise axes TT and L of the turning tail 40 and front arm 38 and also parallel to the wheel axes R and F.

However, when viewed from the side, one can see the unique geometry of the riding device 30 disclosed and described herein. Even in the straight-line, forward rolling orientation in FIGS. 17 and 18, a number of axes of the device 30 are not aligned with one another. For example, the turning plates 166 and 192 define a turning plane P that is tilted at a rearward angle relative to a horizontal reference such as the ground. The turning axis T, as noted above, is perpendicular to the plane P and thus also tilted rearward relative to a vertical reference. The turning tail lengthwise axis TT is not horizontal, but instead angled upward relative to a horizontal reference, from the rear wheel axis R to the center point of the turning plates 166, 192 and also to the front arm pivot axis A. Likewise, the lengthwise axis L of the front arm 38 is tilted upward from the front wheel axis F to the front arm axis A. This places the front arm axis A at an elevation that is higher than both the front and rear wheel axes F and R.

The turning plane P defined by the turning plates 166, 192 is further tilted at an angle more rearward relative to the lengthwise axis of the turning tail TT. This results in the turning axis T not being perpendicular to the turning tail lengthwise axis TT as well as not being vertically oriented.

The novel geometry of the body 32 on the riding device 30 results in a unique articulated turning motion for the riding device 30, as can be seen in FIGS. 19 and 20. As the turning tail 40 turns in one direction or the other relative to the front arm 38, the turning tail axis TT becomes oriented at an angle relative to the lengthwise axis L of the front arm 38 and platform structure 42. The offset angle of the turning axis T relative to both the lengthwise axis TT of the turning tail 40 and the lengthwise axis L of the front arm 38 causes the rear wheel axis R and the front wheel axis F to no longer lie parallel to one another. This is the case both when viewed from the top and when viewed from the side. The offset angle of the turning plates and, thus the turning axis T results in a leaning or twisting motion of the front arm 38 relative to the turning tail 40. Since the turning tail 40 has two wheels, both wheels remain on the ground, which results in the rear wheel axis R remaining parallel with the horizontal reference, i.e. the ground, when the device 30 is turning. This causes the front arm 38, and thus the front wheel 34, to tilt sideways toward or in the direction of the turn. This puts the front wheel 34 at a slight camber. With the front wheel 34 tilted into the turn, the riding device 30 will turn more easily, as if riding a snowboard and performing an edge turn. As can be seen in the figures, during a turn, the front wheel 34, and particularly its rolling axis F, is no longer parallel to the horizontal reference, i.e., the ground. The tighter the turn, the more the front wheel will tilt into the turn.

Figure 21:
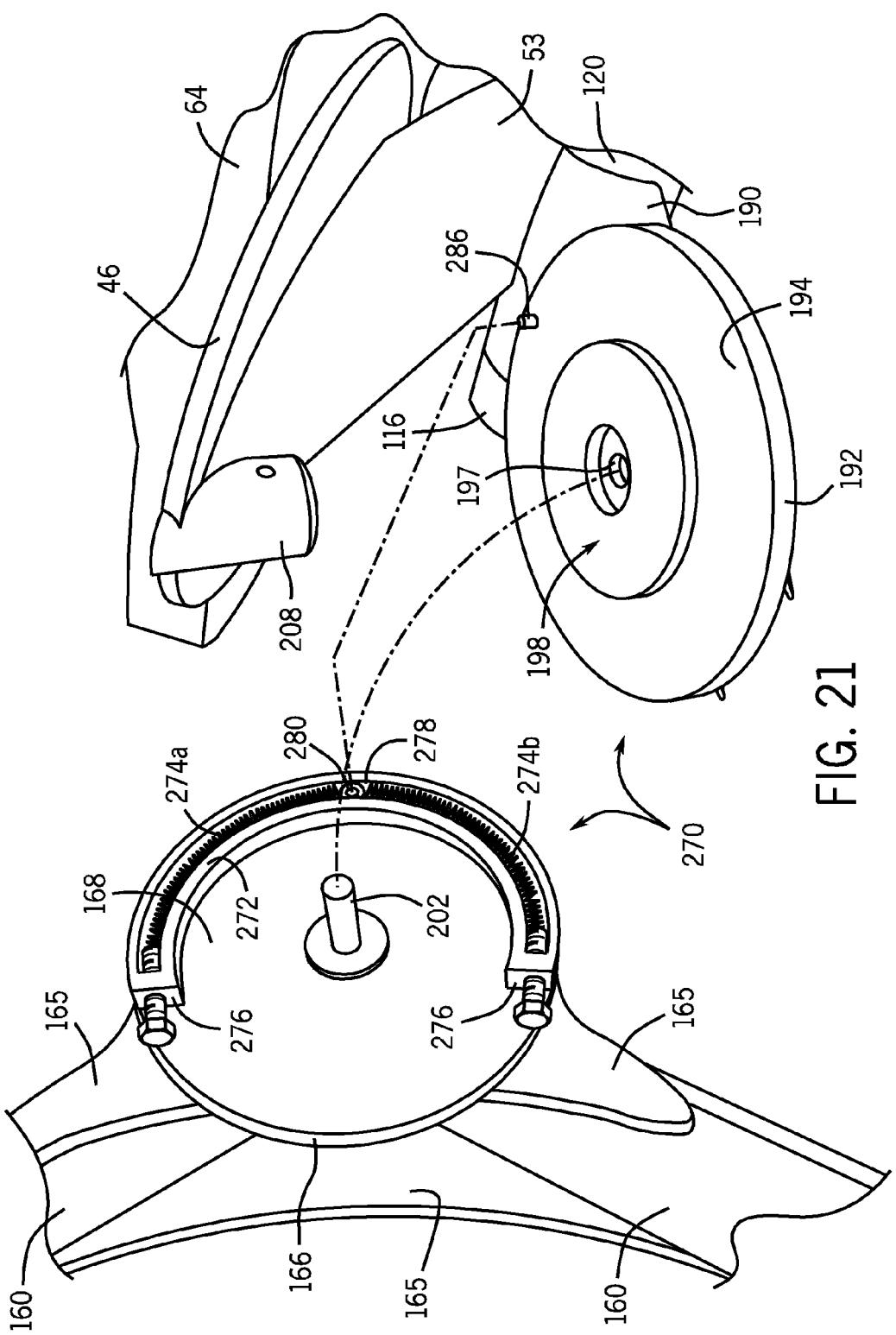
FIG. 21 shows a partial exploded view of one example of a self-centering mechanism for the riding devices shown in FIGS. 1-4 and 10.
Figure 22:
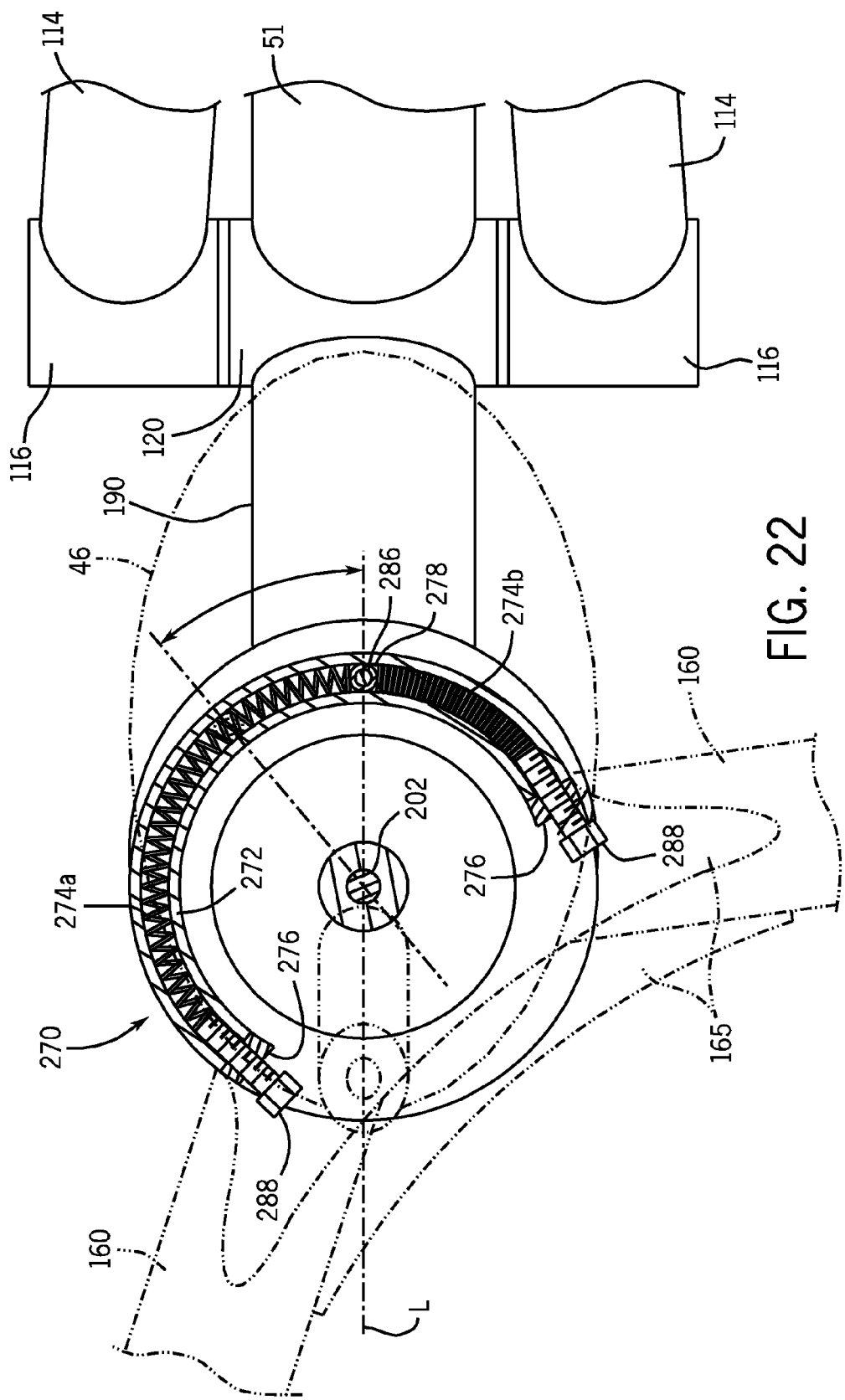
FIG. 22 shows a cut away view of the self-centering mechanism of FIG. 21 during use.

In one example, the disclosed snowboard simulation riding device 30 can also include a self-centering mechanism that biases the turning tail 40 to a centered or home position aligned with the lengthwise axis of the body 32. One example of such a self-centering mechanism 270 is illustrated in FIGS. 21 and 22. In this example, the self-centering mechanism 270 is incorporated into the portion of the joint part forming the turning or tail pivot axis T. The self-centering mechanism 270 can be utilized equally well with the turning tail 40 or the turning tail 180, each of which is described above.

The self-centering mechanism 270 has a curved spring track 272 carried on a perimeter of the first turning plate 166 on the downward facing flat surface 168. A pair of elongate compression springs 274a and 274b are seated and captured within the track 272. The distal ends of the spring track 272 each create a spring stop 276 thereat for a respective one of the springs 274a, 274b. That end of each of the compression springs 274a and 274b is seated against or adjacent a corresponding one of the stops 276. A floating stop 278 is also slidably captured within the spring track 272. The floating stop 278 is positioned directly between the other ends of the springs 274a and 274b. The floating stop 278 has a bore 280 formed therein. In this example, the bearing shaft 202 protrudes through the center of the flat surface 168 on the turning plate 166.

The second turning plate 192 on the extension 190 of the body 32 has the center opening 197, through which the bearing shaft 202 is received. A centering pin 286 protrudes from the flat surface 196 on the second turning plate 192. The centering pin 286 is sized to seat in the bore 280 in the floating stop 278 when the two plates 166 and 192 are joined together. The centering pin 286 is positioned radially outward from the center opening 197 near a perimeter of the second turning plate 192. The centering pin 286 is affixed to the second turning plate 192 and does not move or rotate during a turn, and neither does the second turning plate 192 in this example.

FIG. 22 shows a plan view of the self-centering mechanism 270 during use. In the disclosed example, the turning tail 40 or 180 can turn relative to the body 32, as discussed above, when the user leans the platform structure 42 in one direction or the other about the lengthwise axis L to initiate a turn. As the turning tail 40 or 180 pivots, the first turning plate 166 can rotate with the turning tail relative to the fixed second turning plate 192. Since the centering pin 286 is fixed, the floating stop 278 will remain stationary relative to the second turning plate 192 as the turning tail pivots or rotates. However, the spring track 272 rotates along with the first turning plate 166 relative to the second turning plate 192 during the turn. As the spring track 272 rotates about the tail axis T, the floating stop 278 effectively floats or slides along the track because it is held fast by the fixed centering pin 286. During the turn, one of the springs 274b will be shortened and compressed between the floating stop 278 and its respective fixed stop 276, as shown in FIG. 22. The spring 274b is compressed because its corresponding spring stop 276 moves in a direction toward the centering pin 286 and the floating stop 278 Likewise, the other spring 274a will be free to extend because its respective spring stop 276 moves away from the floating stop 278 and centering pin 286 as shown.

While under compression, the spring 274b will exert a biasing force against the stops 276 and 278. When the rider comes out of a turn, the compressed spring 274b the biasing force is applied equally in opposite directions against the spring stop 276 and the floating stop 278. The compressed spring 274b will thus bias the spring stop 276 away from the floating stop 278 and centering pin 286. This in turn biases the turning tail 40 or 180 out of the turn and back toward a central or home position aligned with the longitudinal axis L of the body 32. Turning the tail 40 or 180 in the opposite direction will cause the spring 274a to compress, biasing the turning tail back toward the centered or home position.

In one example, adjustment screws 288 can be threaded into each end of the spring track 272 and extending into the channel of the track adjacent the spring stops 276. Exposed ends of the screws 288 can bear against the ends of the springs 274a, 274b instead of fixed surfaces of the spring stops. The user can extend or retract either or both of the screws 288 to adjust the spring force applied on either side of the floating stop 278 within the spring track 272. Each spring 274a, 274b can be independently adjusted as needed or desired. For example, a user can increase the compression on each spring by extending both screws into the end of the spring track. This would increase the biasing force generated by both springs 274a, 274b toward the home position. Alternatively, the user can independently adjust the compression of each spring 274a, 274b individually. This can be done to precisely center the turning tail and compensate for any difference in the spring force of the springs 274a, 274b. The screws 288 can instead be adjusted to bias the turning tail to a slightly turned home position in one direction or the other, if desired.

As will be evident to those having ordinary skill in the art, the configuration, construction, and orientation of the various components of the body 32 can vary within the spirit and scope of the present invention. It is possible that the joint part is constructed whereby the device has no turning plates and the turning tail pivots instead only about the bearing shaft 202 or other such pivot shaft or axle. It is also possible that the joint part is constructed whereby the device has no bearing shaft or other turning axle or shaft and the turning tail pivots instead only about a turning plate and bearing mechanism. The angular relationship of the components of the body 32 can also vary considerably, as the body components, including the platform structure 42, the front arm 38, and the turning tail 40, can vary in shape structure from the disclosed examples. For example, the legs 114 of the V-shaped front arm 38 in the disclosed example are oriented at about 3.9° from the lengthwise axis L or 7.8° from one another. When viewed from the side, the front arm 38 is oriented at an upward angle of about 5.7° relative to ground from the front wheel axis to the arm pivot axis A. Similarly, an axis along the rear legs 160 is oriented at an upward angle of about 15.2° from the rear wheel axis relative to ground. However, the rear turning tail 40 is oriented at an angle of about 11.75° for a line extending from the rear wheel axis to the front arm axis A relative to ground. Thus, the rear legs do not lie along such a line because of the shape of the legs, pivot plates, and the like.

Further, the V-shaped rear legs 160 on the turning tail 40 are oriented at an angle of about 24.7° from the lengthwise axis L or about 49.4° from one another. The V-shaped rear legs 182 on the alternate turning tail 180 are oriented at about 59° from the lengthwise axis L or about 118° from one another. The forgoing angular relationships are mentioned for illustrative purposes only and can vary considerably without departing from the spirit and scope of the present invention. In this example, the upwardly angled front arm and rear legs elevate the joint part above the ground to create ground clearance. However, the shape, contour, and orientation of these body parts can vary.

With further reference to FIGS. 13-16, the shock absorber 228 is oriented at an angle β1 of about 25° relative to the travel arc tangent S for the suspension mechanism in FIG. 13. The shock absorber 228 is oriented at an angle β2 of about 35° relative to the tangent S for the alternate suspension mechanism shown in FIG. 14. The alternate shock absorber 248 is oriented at an angle β3 of about 25° relative to the tangent S for the alternate suspension mechanism shown in FIG. 15. Again, the size and contour of the links of the mechanism, and thus the orientation and stroke of the shock absorbers can vary as well.

The orientation and angle of the turning plates 166 and 192 and the turning axis T can also vary within the spirit and scope of the present invention. In one extreme example, if the turning plates were vertically oriented, the turning axis would be horizontal. This would produce a riding device where the front wheel would camber, but where the rear tail would not turn. At the other extreme, the plates could be horizontally oriented leaving the turning axis directly vertical. This arrangement would result in a turning tail that would turn, but where the front wheel would not camber at all. In the disclosed example, the turning plates define a plane oriented at an angle of about 35° from the plane of the standing platform or the ground. This orients the turning axis T at an angle of about 55° relative to the standing platform plane or the ground. The riding device will produce more rear wheel steer and less front wheel camber during a turn, the greater the angle of the turning axis relative to ground Likewise, the riding device will produce more front wheel camber and less rear wheel steer, the lesser the angle of the turning axis T orientation relative to ground.

Though the riding device disclosed herein is not intended to be limited to any particular angle for the rear turning or tail axis T, the axis is preferably such that the user can generate sufficient steer per degree of rotation of the platform structure 42 about the lengthwise axis L. In one example, the turning axis T is oriented at about 45° or more relative to ground. Too much front wheel camber with too little rear wheel steer or turn could result in limited steering capability while the front wheel skids sideways more than it rolls on its axis. The orientation angle of the turning axis T can be tuned, however, to achieve desired turning characteristics for a particular riding device configuration.

Although certain wheeled devices and snowboard simulation devices and features have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A wheeled riding device comprising:
  a body with an elongate front arm and a turning tail pivotally connected relative to one another at a joint part;
  a front wheel carried by a forward end of the front arm;
  rear wheels carried by a rear end of the turning tail; and
  a standing platform supported over the front arm and turning tail,
  wherein the rear wheels and turning tail can pivot laterally side to side relative to the front arm, and wherein the front wheel and front arm can pivot vertically up and down relative to the standing platform.

2. A wheeled riding device according to claim 1, wherein the joint part is part of and beneath the standing platform.

3. A wheeled riding device according to claim 1, wherein the front arm pivots about an arm axis oriented generally horizontally side to side and the turning tail pivots about a tail axis oriented generally vertically but tilted at an angle relative to a vertical reference.

4. A wheeled riding device according to claim 1, further comprising a suspension mechanism connected between the standing platform and the front arm.

5. A wheeled riding device according to claim 4, wherein the suspension mechanism includes a shock absorber and a set of optionally selectable links different from one another, each link for connecting the shock absorber to the wheeled riding device.

6. A wheeled riding device according to claim 4, wherein the standing platform and the front arm each have a V-shaped structure with a pair of spaced apart legs, and wherein the suspension mechanism includes a shock absorber mounted between the legs of each.

7. A wheeled riding device according to claim 1, further comprising:
  only one front wheel;
  two of the rear wheels;
  two brakes, one each coupled to a respective one of the two rear wheels; and
  a hand held actuator coupled to the two brakes by cables and having two levers, one of the two levers for independently operating a corresponding one of the two brakes.

8. A wheeled riding device according to claim 1, wherein the joint part has a plate connected to a mating plate on the turning tail, whereby mating surfaces of the plate and mating plate define a plane and wherein a tail axis is oriented perpendicular to the plane, the turning tail pivotable about the tail axis.

9. A wheeled riding device according to claim 8, wherein the turning axis is oriented generally vertically but tilted at an angle relative to a vertical reference.

10. A wheeled riding device according to claim 8, further comprising a self-centering mechanism associated with the turning tail that biases the turning tail to a center home position whereby the front wheel and the rear wheels roll in the same direction.

11. A snowboard simulation device comprising:
  an elongate front arm with a free end and a back end;
  a turning tail with a forward end and a rear end;
  a platform structure defining foot landings and having a lengthwise axis, the back end of the front arm and the forward end of the turning tail each pivotally connected to the platform structure;
  a front wheel carried by the free end of the front arm; and
  rear wheels carried by the rear end of the turning tail,
  wherein, by turning the platform structure about its lengthwise axis, the front arm turns relative to the turning tail side to side and the front wheel is cambered to the same side.

12. A snowboard simulation device according to claim 11, wherein the front arm can pivot about the back end at an arm pivot such that the free end moves up and down relative to the platform structure.

13. A snowboard simulation device according to claim 11, wherein the platform part has a plate connected to a mating plate on the turning tail, whereby mating surfaces of the plates define a plane and are pivotable relative to one another about a tail axis oriented perpendicular to the plane.

14. A snowboard simulation device according to claim 13, wherein the plane is oriented generally horizontally but tilted at an angle relative to a horizontal reference.

15. A snowboard simulation device according to claim 14, wherein the front arm can pivot at its back end about a generally horizontal, laterally oriented arm axis such that the free end can move up and down relative to the platform structure.

16. A snowboard simulation device according to claim 11, further comprising a suspension mechanism connected between the platform structure and the front arm between the back end and free end, the suspension mechanism including a shock absorber and a link connecting one end of the shock absorber to the device.

17. A snowboard simulation device according to claim 16, further comprising a suspension kit including plurality of different, interchangeable components optionally selectable to selectively alter one or more performance characteristics of the suspension mechanism.

18. A snowboard simulation device according to claim 11, further comprising two rear wheels, a brake coupled to each of the two rear wheels, and a hand brake actuator for operating the brakes, the hand brake actuator having two levers, one for independently actuating each of the brakes.

19. A snowboard simulation device according to claim 11, further comprising a self-centering mechanism configured to bias the turning tail to a center home position relative to the front arm.

20. A snowboard simulation device comprising:

an elongate front arm with a free end and a back end;

a turning tail with a forward end and a rear end;

a platform structure defining foot landings, the front arm connected to and pivotable about an arm axis and the turning tail connected to and pivotable about a tail axis relative to the platform structure;

a single front wheel carried by the free end of the front arm;

two laterally spaced apart rear wheels carried by the rear end of the turning tail; and a brake associated with each of the rear wheels, wherein the arm axis is generally horizontal and oriented perpendicular to a lengthwise axis of the platform structure and wherein the tail axis is generally vertical but tilted rearward at an angle relative to a vertical reference, resulting in an articulated steering motion when the front arm is leaned to one side or the other about the lengthwise axis.

* * * * *